United States Patent
Anbazhagan et al.

(10) Patent No.: US 12,229,585 B2
(45) Date of Patent: Feb. 18, 2025

(54) BACK-END TASK FULFILLMENT FOR DIALOG-DRIVEN APPLICATIONS

(71) Applicant: Amazon Technologies, Inc., Seattle, WA (US)

(72) Inventors: Vikram Sathyanarayana Anbazhagan, Seattle, WA (US); Swaminathan Sivasubramanian, Sammamish, WA (US); Stefano Stefani, Issaquah, WA (US); Vladimir Zhukov, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 17/145,133

(22) Filed: Jan. 8, 2021

(65) Prior Publication Data

US 2021/0132986 A1  May 6, 2021

Related U.S. Application Data

(63) Continuation of application No. 15/360,818, filed on Nov. 23, 2016, now Pat. No. 10,891,152.

(51) Int. Cl.
*G06F 9/48* (2006.01)
*G06F 40/35* (2020.01)

(52) U.S. Cl.
CPC ............ *G06F 9/4843* (2013.01); *G06F 40/35* (2020.01)

(58) Field of Classification Search
None
See application file for complete search history.

(56) References Cited

U.S. PATENT DOCUMENTS

| | | | |
|---|---|---|---|
| 6,246,981 B1 | 6/2001 | Papineni et al. | |
| 6,415,257 B1 | 7/2002 | Junqua et al. | |
| 6,510,411 B1 | 1/2003 | Norton et al. | |
| 7,024,348 B1 | 4/2006 | Scholz et al. | |
| 7,197,460 B1 | 3/2007 | Gupta et al. | |
| 9,336,494 B1 * | 5/2016 | Purpura | G06N 20/00 |
| 9,742,912 B2 * | 8/2017 | Srivastava | H04M 3/4936 |
| 10,891,152 B2 | 1/2021 | Anbazhagan et al. | |
| 2007/0143099 A1 | 6/2007 | Balchandran et al. | |

(Continued)

FOREIGN PATENT DOCUMENTS

| | | |
|---|---|---|
| CN | 102792320 A | 11/2012 |
| CN | 103095325 A | 5/2013 |

(Continued)

OTHER PUBLICATIONS

Yu, et al., "LSTM Encoder-ecorder for Dialogue Response Generation," publisher: IEEE, published 2006 pp. 538-543.

(Continued)

*Primary Examiner* — Eric C Wai
(74) *Attorney, Agent, or Firm* — Robert C. Kowert; Kowert, Hood, Munyon, Rankin & Goetzel, P.C.

(57) ABSTRACT

A determination is made as to whether a value of a first parameter of a first application is to be obtained using a natural language interaction. Based on received input, a first service of a plurality of services is identified. The first service is to be used to perform a first task associated with the first parameter. Portions of the first application to determine the value of the first parameter and to invoke the first service are generated.

20 Claims, 15 Drawing Sheets

(56) References Cited

U.S. PATENT DOCUMENTS

| | | | |
|---|---|---|---|
| 2010/0298012 A1 | 11/2010 | Damarla | |
| 2013/0102295 A1 | 4/2013 | Burke et al. | |
| 2013/0268260 A1 | 10/2013 | Lundberg et al. | |
| 2015/0263941 A1 | 9/2015 | Jung | |
| 2016/0042748 A1 | 2/2016 | Jain et al. | |
| 2016/0225370 A1 | 8/2016 | Kannan et al. | |
| 2017/0116982 A1 | 4/2017 | Gelfenbeyn et al. | |
| 2017/0125008 A1 | 5/2017 | Maisonnier et al. | |
| 2017/0193387 A1 | 7/2017 | Lavallee | |
| 2017/0286916 A1 | 10/2017 | Skiba et al. | |
| 2017/0337478 A1 | 11/2017 | Sarkaya | |
| 2017/0372200 A1 | 12/2017 | Chen | |
| 2018/0075343 A1 | 3/2018 | van den Oord et al. | |
| 2018/0090136 A1* | 3/2018 | Connell, II | G06F 40/20 |
| 2018/0203852 A1 | 7/2018 | Goyal | |

FOREIGN PATENT DOCUMENTS

| | | |
|---|---|---|
| EP | 2933070 | 10/2015 |
| WO | 9723088 | 6/1997 |
| WO | 2008054331 | 5/2008 |
| WO | 2011088053 A2 | 7/2011 |

OTHER PUBLICATIONS

Christian S. Perone, Machine Learning: Cosine Similarity for Vector Space Models (Part III),{ published: Terra Incognita, Dec. 9, 2013, pp. 1-4.
U.S. Appl. No. 15/197,022, filed Jun. 29, 2016 Simon Peter Reavely et al.
U.S. Appl. No. 15/248,211, filed Aug. 26, 2016, Shaun Nidhiri Joseph et al.
Robert Jamison, "Announcing a New Tool for Building Interactive Adventure Games on Alexa", Amazon Mobile App Distribution Blog, Retrieved from URL: developer.amazon.com/public/community/post/TxEQV5K754YS77/Announcing-a-New-Tool-for-Building-Interactive-Adventure-Games-on-Alexa on Oct. 30, 2016, pp. 1-11.
"Getting Started with the Alexa Skills Kit", Amazon Apps & Games Developer Portal, Retrieved from URL: developer.amazon.com/pulbic/solutions/slexas/alexa-skills-kit/getting-started-guide on Oct. 30, 2016, pp. 1-7.
Seth Rosenberg, "How to Build Bots for Messenger", Facebook for Developers, Retrieved from URL: developers.facebook.com/blog/post/2016/04/12/bots-for-messenger on Oct. 30, 2016, pp. 1-5.
Ali El-Kahky, et al., "Entending Domain Coverage of Language Understanding Systems via Intent Transfer Between Domains Using Knowledge Graphs and Search Query Click Logs", 2014 IEEE International Conference on Acoustic, Speech and Signal Processing (ICASSP), pp. 4087-4091.
Elad Natanson, "Messaging Platforms, Bots and the Future of Mobile", Retrieved from URL: www.forbes.com/sites/eladnatanson/2016/04/08/messaging-platforms-bot-and-the-future-of-mobile/#2d1ab79884af on Oct. 30, 2016. pp. 1-7.
"Messenger Platform", Facebook for Developers, Retrieved from URL: developers.facebook.com/doc/messenger-platform on Oct. 30, 2016, pp. 1-3.
Collen Estrada, "Microsoft Bot Framework", Mar. 30, 2016, Retrieved from URL: blog.botframework.com/2016/03/30/BotFramework/ on Oct. 30, 2016, pp. 1-7.
"Microsoft Cognitive Services—APIs", Retrieved from URL: www.microsoft.com/cognitive-services/en-us/apis on Oct. 30, 2016, pp. 1-8.
Himanshu S. Bhatt, et al., "Cross-domain Text Classification with Multiple Domains and Disparate Label Sets", Proceedings of the 54th Annual Meeting of the Association for Computational Linguistics, Aug. 7-12, 2016, pp. 1641-1650.
Amit Fulay, "Say hello to Google Allo: a smarter messaging app", Retrieved from URL: blog.google/products/allo/google-allo-smater-messaging-app on Oct. 30, 2016, pp. 1-14.
"Training for the Alexa Skills Kit", Amazon Apps & Games Developer Portal, Retrieved from URL: developer.amazon.com/public/solutions/alexa/alexa-skills-kits/content/alexa-skilss-developer-training on Oct. 30, 2016, pp. 1-4.
Wikipedia, "Vorbis", Retrieved from URL: en.wikipedia.org/wiki/Vorbis on Sep. 26, 2016, pp. 1-10.
U.S. Appl. No. 15/360,814, filed Nov. 23, 2016, Vikram Sathyanarayana Anbazhagan, et al.
U.S. Appl. No. 15/841,122, filed Dec. 13, 2017, Rashmi Gangadhariah.
Claus Brabrand "PowerForms: Declarative client-side form field validation" Brics Report Series, Jan. 1, 2000, pp. 205-214.
Svetlana Stoyanchev et al "Rapid Prototyping of Form-driven Dialogue Systems Using an Open-Source Framework", Proceddings of the Sigdial 2016 Conference, pp. 216-219.
Svetlana Stoyanchev et al., "Rapid Prototyping of Form-driven Dialogue Systems Using an Open-source Framework", Proceedings of the SIGDIAL 2016 Conference, Sep. 13-15, 2016, pp. 216-219, Los Angeles, USA.
Office Action mailed Sep. 23, 2023 in Chinese Patent Application No. 201780072369.5, Amazon Technologies, Inc., pp. 1-14 (including translation).

* cited by examiner

BACK-END TASK FULFILLMENT FOR DIALOG-DRIVEN APPLICATIONS

BACKGROUND

This application is a continuation of U.S. patent application Ser. No. 15/360,818, filed Nov. 23, 2016, which is hereby incorporated by reference herein its entirety.

In recent years, the number of small-footprint sensor-containing devices such as smart phones, wearable devices and various other "Internet of Things" (IoT) devices available to consumers have been increasing dramatically. Many of these devices comprise sensors capable of detecting voiced commands; in some cases, sensors for detecting signals of other modalities such as gestures, touch pressure levels, gaze direction changes and the like may also be incorporated in these devices. The small-footprint devices are often designed to communicate with server farms at data centers which can be used to perform compute-intensive tasks.

Figure 1:
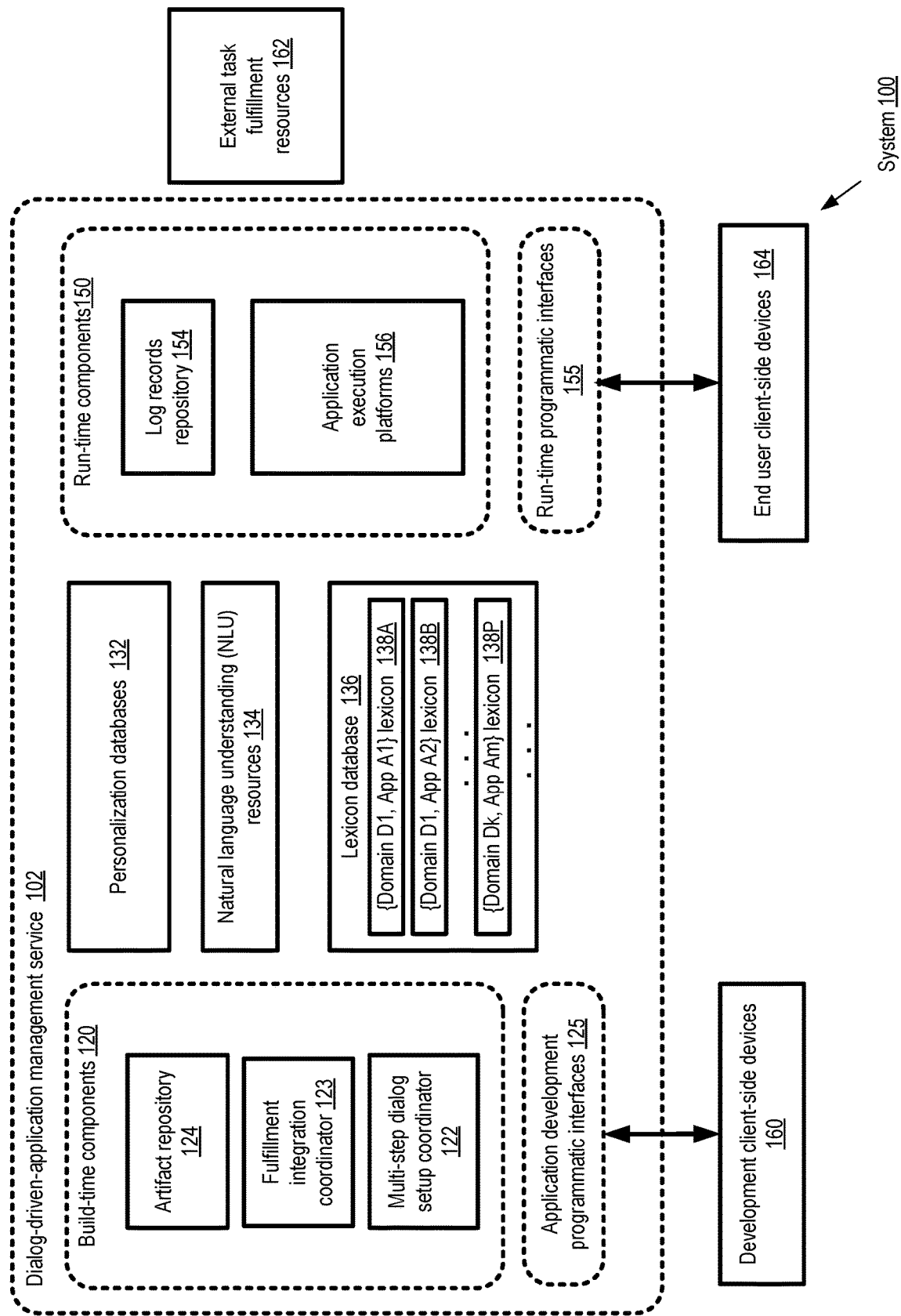
FIG. 1 illustrates an example system environment in which a network-accessible service for the development and deployment of dialog-driven applications may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for simplifying the development and deployment of dialog-driven applications are described. In one embodiment, the term "dialog-driven application" may refer to an application in which, in order to complete a particular task or function, respective values of one or more parameters may be obtainable from analysis of natural language voice and/or text input provided by an end user of the application. According to some embodiments, a network-accessible service may be implemented for the management of such applications. In one embodiment, the service may utilize one or more natural language understanding (NLU) components, including for example a variety of models, to manage aspects of the natural language dialogs to be used to obtain the parameter values. The NLU models may be trained using a collection of natural language input examples associated with numerous applications of one or more problem domains over time in one embodiment. In one embodiment, programmatic interfaces implemented at such a service, such as a graphical user interface of a web-based console, may be used by an application developer to specify various aspects of a new dialog-driven application being developed, without providing the source code to be used for managing the flow of multi-step interactions of end users with the application. The service may utilize the NLU components to generate the portion of the application which manages the multi-step interactions in one embodiment. At run-time, after the interactions with the developer regarding the multi-step dialog have been completed and an executable version of the program has been generated and deployed, in one embodiment the NLU components (which may utilize various automated speech recognition algorithms and/or natural language processing algorithms) may be used to capture and interpret the dialog with individual end users; the developer may not need to specify details regarding the particular algorithms to be used, or even be aware of the algorithms that are used.

In one embodiment, the application management service may be designed to enable dialog-driven applications for a variety of problem domains (e.g., applications for ordering food, travel-related applications, entertainment-related applications and like) and a variety of end-user device types (e.g., voice-directed personal assistants, smart phones, wearable devices, and the like) to be developed and deployed, without requiring application developers to worry about platform-specific details. In one embodiment, the service may enable customers to integrate existing applications (which may be executed using a variety of different resources) with a dialog-based front-end capability with a minimum of programming effort. In such an embodiment, application developers may use the interfaces of the service to indicate high-level steps of the dialogs needed to identify parameter values associated with various tasks to be performed using the application, and the programs, services or resources to be invoked to perform or fulfill the tasks after the parameter values for the tasks have been identified using the dialogs in various embodiments. Any desired combinations of a number of different types of resources may be used to fulfill the tasks in one embodiment, including various resources of other network-accessible services, as described below in further detail. In one embodiment, usage records from some applications may be used to improve other applications, e.g., using cross-application or cross-domain lexicon enhancement techniques.

According to one embodiment, a natural language understanding model may be trained using respective natural language input examples (e.g., various word strings which may be expected to be used in dialogs) corresponding to a plurality of applications. In such an embodiment, a determination may be made whether a value of a first parameter of a first application is to be obtained using a natural language interaction, and if such natural language interaction is to be employed, at least a portion of the first application may be generated using the natural language model. In another embodiment, one or more computing devices of a network-accessible application management service may determine, e.g., based on input received from an application developer via a programmatic interface such as a graphical console, one or more intents associated with a particular dialog-driven application corresponding to a given problem domain. Each of the intents may correspond to a particular task to be initiated on behalf of an end user of the application (such as, for example, ordering a pizza or some other part of a meal). In addition, in at least some embodiments the service may determine, based on input provided by an application developer, one or more baseline word strings of a multi-step natural language dialog to be used to set respective values of one or more parameters of the intents, where the multi-step dialog comprises interactions between the application and an end user. The service may generate and store an executable representation of the dialog-driven application in some embodiments. The executable representation may utilize a lexicon comprising the one or more baseline word strings provided by the developer in one embodiment. In at least some embodiments, the service may also determine the problem domain of a given application, e.g., based on explicit developer input indicating the domain or based on analyzing the word strings indicated by the developer using NLU components of the service, and respective domain-specific or application-specific lexicons may be maintained by the service. The lexicons may be enhanced, e.g., using one or more machine learning algorithms which may be implemented at the NLU components in various embodiments. As described below in further detail, in one embodiment log records of actual interactions with end users (and/or other corpora) may be used to add new word strings (which may be referred to as "learned" word strings) to the lexicons over time. The executable representation of the application may be deployed to various execution platforms as desired in one embodiment. In some embodiments, a front-end or end-user-facing component of the application may be deployed to various types of small-footprint devices or components, such as to voice-driven home assistant devices, virtual reality or augmented reality devices, intelligent appliances, smart phones, wearable devices, and the like.

In at least some embodiments, indications of the types of end user devices which are expected to be used, as well as the services and/or resources which are to be used to fulfill the tasks requested via the application, may also be provided by the application developer using the programmatic interfaces of the application management service. In one embodiment, numerous network-accessible services may be available for performing back-end tasks associated with dialog-driven applications, and a particular service to be used for a given application's task or intent may be identified based at least in part on input received from the application developer or owner. Depending on the end user device types and/or the fulfillment resources, appropriate hooks (e.g., code which enables communication of the information needed for various tasks between the executable representation and the devices/resources) may be added to the executable representation of the application by the service in such embodiments. In one embodiment, one or more network-accessible services of a provider network (e.g., services other than the application management service itself) may be used to implement the back-end tasks of the dialog-driven application. Networks set up by an entity such as a company or a public sector organization to provide one or more network-accessible services (such as various types of cloud-based computing or storage services, as well as an application management service usable to develop dialog-driven applications) accessible via the Internet and/or other networks to a distributed set of clients may be termed provider networks in some embodiments. A provider network may sometimes be referred to as a "public cloud" environment. The resources of a provider network may in some embodiments be distributed across multiple data centers, which in turn may be distributed among numerous geographical regions (e.g., with each region corresponding to one or more cities, states or countries). In some embodiments, a given dialog-driven application may be invoked by end users via voice interactions and/or text message interactions. In one embodiment, respective executable versions of a given dialog-driven application may be generated for the different end user device types which are to be supported. In another embodiment, a single executable representation may be used for multiple end user device types.

According to at least some embodiments, various personalization techniques may be used to enhance the user experience associated with a dialog-driven application (e.g., by reducing, using end user profile information, the number of parameters for which values have to be provided explicitly in the dialog). In one embodiment, for example, individual end users of an application may be provided the choice of opting in for profile-based personalization—e.g., if and only if the end user agrees, a profile indicating parameter preferences of the user and/or the history of the user's interaction with the application may be maintained. It is noted that, in at least one embodiment, while the application management service may provide the tools necessary to implement personalization, it may be left up to the application developer or owner to decide whether personalization is to be used, and if so, exactly how it is to be used in the context of any given application. In one example scenario, if in one embodiment an end user fails to provide a value for a particular parameter associated with a back-end task during a particular natural language interaction session, or indicates to the application that the user's "usual" settings are to be used, the service may use profile information to set the value. An indication as to whether personalization is to be used for parameter value selection may be provided by the application developer via the programmatic interfaces of the application management service in some embodiments.

In some embodiments, a given dialog-driven application may comprise several intents, each associated with a corresponding task. For example, an application for ordering a meal may comprise respective intents for ordering an appetizer, drinks, a main course, and a dessert. In one embodiment, the application management service may provide programmatic interfaces enabling an application developer to logically link or "chain" intents, and context information may be passed from one intent to the next as needed. In at least one embodiment, the range of possible values of a given parameter may be constrained by or dependent on the value specified by the end user for another parameter. For example, if parameter p1 of an intent I1 is set to X based on an end user's input, parameter p2 of I1 may only take on the values K or L, but if p1 is set to Y, p2 may only be permitted to have the values M or N. In one embodiment, the application management service may allow application developers to specify logical dependencies or relationships between parameters using the service's programmatic interfaces. In various embodiments, the service may implement versioning for the different kinds of entities for which information is stored for a dialog-driven application—e.g., the intents, the intent parameters, the programs/resources used for task fulfillment, and so on.

Example System Environment

FIG. 1 illustrates an example system environment in which a network-accessible service for the development and deployment of dialog-driven applications may be implemented, according to at least some embodiments. As shown, in one embodiment system 100 may comprise various resources of a dialog-driven-application management service 102, including a set of build-time components 120 used primarily (but not necessarily exclusively) for developing the applications and a set of run-time components used primarily (but not necessarily exclusively) for executing portions or all of the applications after they have been developed. (It is noted that some front-end elements of the applications may be run at end user client-side devices 164, such as smart phones, voice-based assistant devices, etc. in the depicted embodiment) The build-time components 120 may comprise, for example, a multi-step dialog setup coordinator 122 responsible for enabling application developers to specify the steps of the interactions needed to determine parameter values for fulfilling various application intents, a fulfillment integration coordinator 123 responsible for inserting the appropriate hooks for invoking resources for implementing the intents into the dialog-driven application, and an artifact repository 124 used for storing various versions of dialog-driven applications and associated metadata. The run-time components 150 may comprise, for example, various pools of application execution platforms 156 at which at least some portions of the dialog-driven applications may be run, as well as a log records repository 154 at which records of interactions of end users with the applications may be stored.

In one embodiment, application developers may utilize development-related programmatic interfaces 125 (e.g., various types of graphical user interfaces including web-based interfaces, application programming interfaces (APIs), command line tools, and the like) from developer client-side devices 160 such as laptops, desktop computers and the like. Using the programmatic interfaces 125, information about application domains, intents within a given dialog-driven application, resources/services to be used to perform the tasks corresponding to the intents, as well as word strings for dialog steps to identify parameter values for various intents may be specified by application developers in various embodiments. In at least some embodiments, such information may be indicated to the application management service 102 by application developers or designers without having to provide any source code. In some embodiments, the developers may provide one or more baseline examples of word strings which are to be used during various stages of the dialog to be used for identifying intent parameter values, and such baseline word strings may be added to the appropriate lexicons in lexicon database 136. In one embodiment, each lexicon 138 stored in database 136 may comprise a set of words or phrases in a given language (or combination of languages) which are to be used in interactions with application end users to identify parameter values and/or other information needed to perform the tasks associated with the applications. The lexicons stored in the database may be identified or indexed in some embodiments, for example, based on the problem domain being addressed and the corresponding application identifier—e.g., lexicon 138A may be associated with application A1 of domain D1, lexicon 138B may be associated with application A2 of domain D1, lexicon 138P may be associated with application Am of domain Dk, etc.

Information about the domains to which the lexicons apply may be helpful in one embodiment, for example, in which word strings which are used successfully for one application may be added to the lexicon of another application of a similar domain or the same domain, using NLU or machine learning techniques.

NLU resources 134 (such as one or more models) of the service may be trained using the word strings or lexicons associated with numerous applications in some embodiments. The NLU models may be used to generate and/or enhance various portions of dialog-driven applications in one embodiment, e.g., to manage the flow of multi-step interactions which may be needed to identify values of various parameters of the applications. Over time, in one embodiment, as more and more dialog-driven applications are generated and deployed using application management service 102, the NLU models may become more sophisticated, so that existing lexicons and applications may be improved (e.g., by adding learned word strings to the lexicons).

Based on the information provided by the application developers using interfaces 125, including specifications for the potentially multi-step dialogs associated with various parameters of different application intents, executable representations of the corresponding applications may be generated or stored in the depicted embodiment, e.g., at least temporarily in artifact repository 124. The application management service 102 may comprise a fulfillment integration coordinator 123 in one embodiment to enable information about various back-end resources and services, which are to be utilized to perform the tasks indicated via the end user dialogs, to be incorporated in the executable representations and/or in associated metadata. The integration coordinator may, for example, in one embodiment, insert appropriate communication modules, formatting modules, data structure transformation code, plug-in modules and the like into the executable versions of the applications, without requiring application developers to supply source code for the integrations. From the artifact repository, portions or all of a given executable application may be deployed to selected execution platforms 156 in the depicted embodiment, e.g., in response to a deployment request from the application developer or owner. In some embodiments, the application owner or developer may specify various characteristics of the particular execution platforms to be used; in other embodiments, the application management service may select the particular execution platforms to be used. The execution platforms 156 may comprise, for example, various virtual and/or physical computer servers in different embodiments; in at least some embodiments, resources of one or more other services of a provider network may be used as discussed below. A number of factors may be considered when selecting the execution platforms to be used for a given dialog-driven application in various embodiments, such as for example the workload levels expected, the physical proximity of the platforms to the intended end-users and/or to the resources to be used to fulfill the intents of the application, preferences and constraints regarding budgets indicated by application owners/developers, and so on.

In various embodiments, numerous resources may be used singly or in combination to perform or fulfill the tasks to be achieved using the dialog-driven application. For example, a dialog-driven application involving ordering a meal may eventually invoke an order-generation program developed by a restaurant, a dialog-driven application involving making travel arrangements may invoke programs for querying airplane flight availability, and so on. The order-generation program and/or the query programs may themselves be executed using other execution platforms (e.g., platforms external to the application management service, such as external task fulfillment resources 162) in some embodiments. Examples of the kinds of resources which may be used after the intent parameters have been determined for various dialog-driven applications are provided below. In some embodiments, at various stages of the development, deployment and use of dialog-driven applications, one or more resource verification components of the application management service (not shown in FIG. 1) may be responsible for ensuring the availability and/or responsiveness of the resources intended for intent task fulfillment. For example, if a network address or Uniform Resource Identifier (URI) associated with a particular task fulfillment program is indicated by an application developer, in some embodiments the resource verification components may be responsible for checking (and/or periodically re-checking) that the network address or URI is functional.

After access to a given dialog-driven application has been enabled for customers, a variety of end user client-side devices 164 may be used to interact with the application using run-time programmatic interfaces 155 in the depicted embodiment. The interactions may be voice-based, text-message based, based on a combination of voice and text, or may use other signal modalities in various embodiments. The client-side devices 164 may be provisioned with a lightweight front-end component of the dialog-driven application in some embodiments. For example, in the case of a voice-based assistant device to be used for one or more dialog-driven applications, in one embodiment software and/or hardware that is capable of detecting at least some voice signals may be incorporated in or installed on the client-side devices 164. In another example, if an end user is going to use a smart phone to interact with the dialog-driven application, in one embodiment a front-end phone application which is configured to examine signals detected by the microphone of the phone may be installed on the phone. In addition to voice-based assistant devices and smart phones, a variety of other end user devices may be used in different embodiments, such as augmented reality or virtual reality headsets, wearable devices, intelligent appliances, security devices such as remotely controllable cameras, and the like.

A number of natural language understanding resources 134 may be utilized at the application management service 102 in one embodiment. Resources 134 may include, for example, computing and/or storage resources used for automated speech recognition (ASR) algorithms and models, natural language processing (NLP) algorithms and models, clustering and other classification models, and so on in the depicted embodiment. The developers of the dialog-driven application may not need to be experts in natural language understanding or machine learning in various embodiments, and may not even be required to indicate the types of algorithms to be used for their applications, either at build time or at run time. In one embodiment, components of the service may invoke the appropriate sets of resources 134 as needed—e.g., ASR algorithms may be invoked at run time to convert the speech of an end user to a sequence of tokens, and NLP algorithms may be used to find scores for matches/similarities between the tokens identified by the ASR algorithms and the kinds of utterances expected during the multi-step dialog interactions and indicated in lexicons 138.

In the depicted embodiment, log records indicative of the interactions with end users may be stored in repository 154. In some implementations, NLU resources 134 may utilize the log records to identify or "learn" additional word strings that may be useful or appropriate for the dialogs of various applications based on the observed behavior of end users, and such learned word strings may be added to the lexicons 138 associated with the applications. Such lexicon enhancements may be performed automatically in some embodiments, e.g., without being prompted by application developers. In other embodiments, approval from the application developers may be obtained before adding a learned word string to a lexicon. In various embodiments, application developers may be able to access the log records stored in repository 154 via programmatic interfaces, and use the log records to improve/modify the lexicons 138 associated with their applications. Data sets other than the application's own end user interaction log records may be used to learn additional word strings in some embodiments: e.g., lexicons of other applications in the same problem domain or other domains may be used, other corpora of natural language interactions may be used, and so on. In one embodiment some enhancements to the lexicon of an application may be performed before the application is deployed—e.g., portions of the application dealing with the flow of multi-step natural language interactions may be generated using NLU models. In one embodiment, for example, the application management service may have richness criteria for the dialog steps, according to which at least a minimum number of word strings, phrases or sentences which are sufficiently different from each other may have to be specified for a given dialog step. If, in such an embodiment, a developer does not provide a sufficiently rich lexicon based on the criteria, or if the developer requests enhancement of the lexicon from the service, machine learning tools may be deployed to identify additional word strings for the application before deployment.

In at least one embodiment, the application management service 102 may provide resources which enable application developers to, at least under certain conditions, store and use personalization information to enhance end user experiences with the dialog-driven applications. For example, in one embodiment, "opt-in" permission may be obtained from an end user to store and use profile-based personalization data for a dialog-driven application, e.g., at the time that the end user first utilizes the application or registers to use the application or at some later time. If the end user agrees, information such as the values typically set by the end user for various intent parameters, a history of the end user's interactions with the application, etc., may be stored in a personalization database 132 in the depicted embodiment. Such personalization information may be used, for example, in one embodiment to set default values for various required intent parameters, or to set values for parameters for which the end user fails to indicate a preference during a given interaction, and so on. In at least some embodiments, an application developer may indicate various application-level preferences regarding personalization to the service 102 at build time—e.g., whether personalization is to be used at all, and how/whether end users are to be informed at run time that profile data is being used on their behalf, etc. Such personalization-related settings may be stored as part of application metadata in various embodiments.

Using an application management service 102, a variety of dialog-driven applications for different application domains may be developed, deployed and improved over time in various embodiments, without requiring the application designers to be experts in programming dialog flows, automated speech recognition or natural language processing. Resources of the serviced may be used in a multi-tenant fashion in one embodiment. In some embodiments, a knowledge base which can be used to benefit from experiences of other developers may be available from the service 102.

Example Multi-Step Dialog

Figure 2:
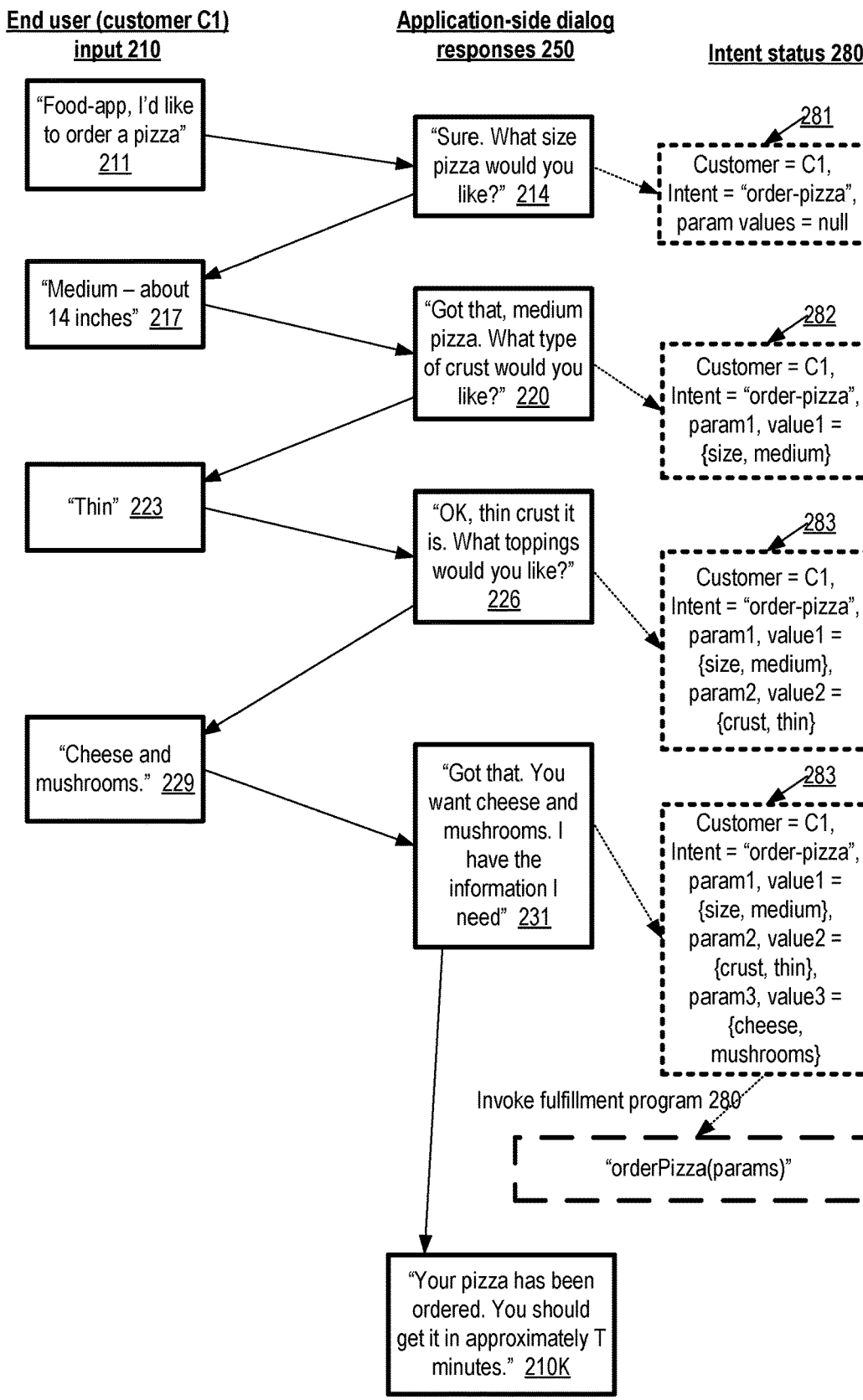
FIG. 2 illustrates example steps of a multi-step dialog for ordering a meal using conversational language, according to at least some embodiments.

FIG. 2 illustrates example steps of a multi-step dialog for ordering a meal using conversational language, according to at least some embodiments. In the depicted embodiment, a customer C1 verbally interacts with an application which has been developed and deployed using a service similar to service 102 of FIG. 1. Examples of the customer's verbal statements are shown in the left part of FIG. 2, labeled "End user (customer C1) input 210". Examples of the application's responses corresponding to the end user input are shown under the label "Application-side dialog responses 250". As the interactions proceed, in the depicted embodiment the application in effect fills out a data structure with intent parameter values, shown in the rightmost part of FIG. 2 under the label "Intent status 280".

The customer invokes the application with the command "Food-app, I'd like to order a pizza" 211 in the depicted example. The introductory term "Food-app" may be considered a "wake word" or a "wake phrase"—a signal to distinguish the interaction with the meal-ordering application from other conversations that may be detected by the audio sensor(s) or microphone(s) being used for the application. ASR/NLP resources may be used by the run-time components of the application to identify the words spoken by the customer, and to ascertain that a pizza is to be ordered. A conversational response "Sure. What size pizza would you like?" 214 may be generated as part of the application's dialog-flow in the depicted embodiment and provided to the customer via a speaker component of the end user device being used. In addition, the application may instantiate an intent called "order-pizza", store an indication of the identity of the customer (C1), and an indication that no parameter values have yet been determined for the intent (as indicated by "param values=null") in intent status 281. The developer of the application associated with the "order-pizza" intent may have indicated, via the programmatic interfaces of the application management service, that among the parameters associated with the intent, the first one whose value should be ascertained is "size"; as a result, the phrase "what size pizza would you like" may be included in the response 214.

Customer C1 may respond with the statement "Medium—about 14 inches" 217 in the depicted embodiment. Note that the "about 14 inches" portion of the statement 217 may be atypical and may not be part of the dialog expected by the application (e.g., if the application is designed with three pizza size indicators "large", "medium" and "small" expected to be used in the dialog). However, the NLP algorithms used by the application may be able to determine, based on analyzing the statement 217, that (a) a "medium" pizza is desired by the customer, and (b) the customer believes that the medium pizza is about 14 inches in diameter. Assuming that the diameter of the medium pizza is in fact supposed to be approximately 14 inches, the size parameter of the intent may be filled with the value "medium", as indicated in status 282, in the depicted embodiment. It is noted that in various embodiments, the dialog-driven application may be designed to respond appropriately to ambiguous or incorrect statements made by the end user. For example, consider a scenario in which the expected set of choices "large", "medium" and "small" for pizza sizes correspond to diameters 18 inches, 14 inches and 10 inches respectively. If the customer responds to the question about desired pizza size by saying "Medium—about 20 inches", "Medium—about 10 inches", or even "Medium—about 16 inches", in one embodiment the application may respond with a clarifying follow-up response roughly equivalent to the following in some embodiments—"I'm sorry, I didn't quite understand. Our medium pizzas are approximately 14 inches in diameter, our large pizzas are about 18 inches, and our small pizzas are about 10 inches. Which size would you prefer?" The management of at least some ambiguous/incorrect end user statements may also be handled without requiring the application developer to provide source code in some embodiments—for example, the word strings corresponding to the clarifying follow-up response may be provided by the developer, and the conditions under which the clarifying follow-up response is to be generated may be indicated by the developer via the programmatic interfaces of the application management service.

In the depicted embodiment, the application developer may have indicated, at build time, that after a value for the pizza size has been determined, the next two parameters for which values are to be obtained from the end user are crust type and toppings. Accordingly, the application may generate the response 220, comprising "Got that, medium pizza. What type of crust would you like?" The customer may respond with a single-word answer "Thin" 223, which would enable the crust parameter value to be set as indicated in intent status 283. After the crust choice has been determined, the application may request the customer to specify toppings, e.g., using the conversational response 226: "OK, thin crust it is. What toppings would you like?" The customer may respond with a list of toppings 229, enabling the toppings parameter values to be set, as indicated in status 283.

After values for all the required parameters have been ascertained, the application may indicate that no more input is needed, e.g., by causing a statement "Got that. You want cheese and mushrooms. I have the information I need" 231 to be generated in the depicted embodiment. (The example assumes that payment information is not required—for example, a credit card that customer C1 has registered with the application may be used by default.) A fulfillment program ("orderPizza(params)") may be invoked by the dialog-driven application to initiate the task corresponding to the intent whose parameters have ben populated, as indicated by arrow 280. After the fulfillment program is successfully invoked, in some embodiments a final statement confirming the task initiation (similar to statement 210K of FIG. 2) may be generated for the customer.

As indicated by the responses (e.g., the use of the words "Sure", "OK", "Got it", "thin crust it is", etc.) generated by the application in the depicted example, in some embodiments the tone of the dialog may be fairly informal. In some embodiments, multiple personas may be available for the application responses, each corresponding for example to a combination of a different tone regarding formality of the language, the gender of the voice used, the approximate age of the individual whose voice is being simulated as the application's voice, etc. The persona (or set of personas from which one is selected at run-time) may be indicated by the application developer via the application management service's programmatic interfaces at build time in various embodiments. Furthermore, in at least some embodiments, an indication of the degree to which confirmations of the customer's statements are to be provided may also be indicated by the application developer programmatically. In the depicted embodiment, each time the application responds to a parameter value specification by the customer, a confirmation of the value is provided. Depending on the preferences of the application developer, in one embodiment such confirmations may not be provided for each parameter value identified; instead, for example, a pair of parameter values may be confirmed at a time, or all the parameter values may be confirmed just prior to invoking the fulfillment program.

Interfaces for Simplified Development of Dialog-Driven Applications

Figure 3:
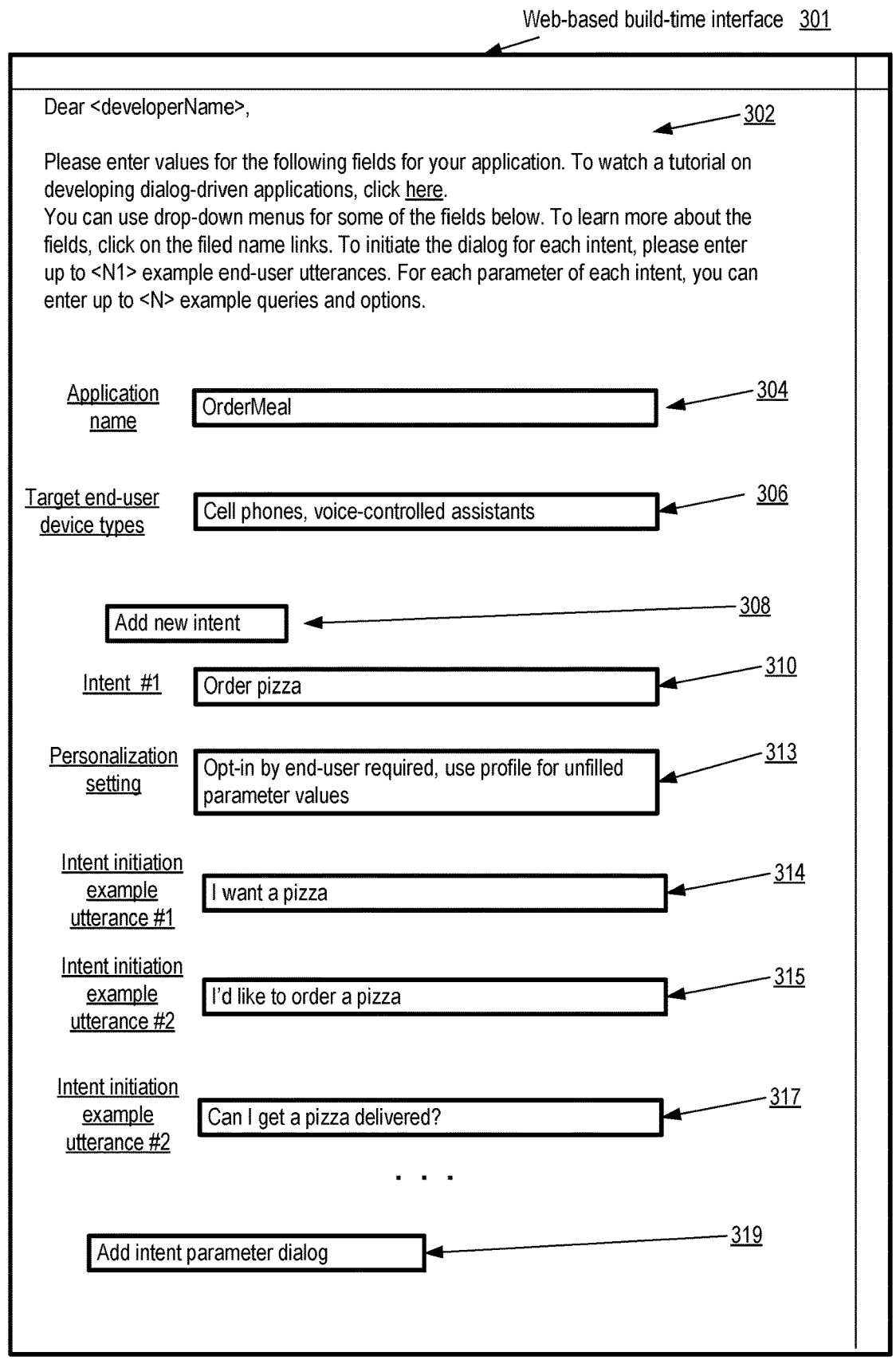
FIG. 3 illustrates an example graphical user interface which may be used to initiate the development of a dialog-driven application, according to at least some embodiments.

FIG. 3 illustrates an example graphical user interface which may be used to initiate the development of a dialog-driven application, according to at least some embodiments. As shown, in one embodiment web-based build-time interface 301 may comprise a message area 302 and a number of field entry elements regarding various aspects of the application. The message area 302 provides general guidance to an application developer, indicating for example that a tutorial on developing dialog-driven applications can be accessed via one of the available links, and that drop-down menus are available for some of the fields.

The application developer may provide an application name using element 304 in the depicted embodiment. In some embodiments the developer may explicitly indicate a problem domain for the application (such as "ordering food items" for the example application shown), which may be helpful as a way to organize related applications. In other embodiments the application management system may infer or deduce the problem domain to which an application is addressed, e.g., using natural language understanding algorithms. The domain information may be used in some embodiments to enhance the lexicon associated with a given application, for example by analyzing the lexicons of similar applications within the domain using machine learning models and adding learned word strings and/or additional phrasing choices to the given application's lexicon. Information about the types of end user devices from which the application is going to be invoked may be provided in field 306—as shown, for example, smart phones and voice-controlled assistant devices may be among the targeted end user devices for the "OrderMeal" application. Information about the target device types may be used to generate one or more executable versions of the application in some embodiments—e.g., one version may be generated for phones and another for voice-controlled assistants, with code for communicating with the appropriate type of device (e.g., with front-end application components resident on the devices) being incorporated in the executable versions.

The "AddNewIntent" button 308 may be used by an application developer to initialize a new intent object for the application in the depicted embodiment. The name of the intent (e.g., "Order pizza") may be provided using element 310. Personalization settings for the intent may be indicated via element 313 in the depicted example. As shown, an end user may be able to opt in for personalization, and if the end user does so, their profile information may be used to set parameter values that are left unfilled or not overridden during the end user's interaction with the application. Respective examples of three initiation word strings (i.e., word strings that, if spoken by or included in a text message by the end user, would cause the application dialog to be started) may be provided via elements 314, 315 and 317 of the interface 301. For example, any of the word sequences "I want a pizza", "I'd like to order a pizza" or "Can I get a pizza delivered?" may be used to activate the application. In embodiments in which voice (rather than text messages) is used by the end user to interact with the application, a combination of ASR and NLP resources may be used at run time to detect the specific words uttered by the individual, and then to assign scores indicating the extent to which the utterance matches one or more of the word strings indicated by the application developer at build time. If the matching score exceeds a threshold, the application may begin the dialog associated with the intent. The application developer may use interface element 319 to specify multi-step or single-step dialogs to be used for identifying values of various parameters associated with a given intent in one embodiment, as discussed in the context of FIG. 4.

Figure 4:
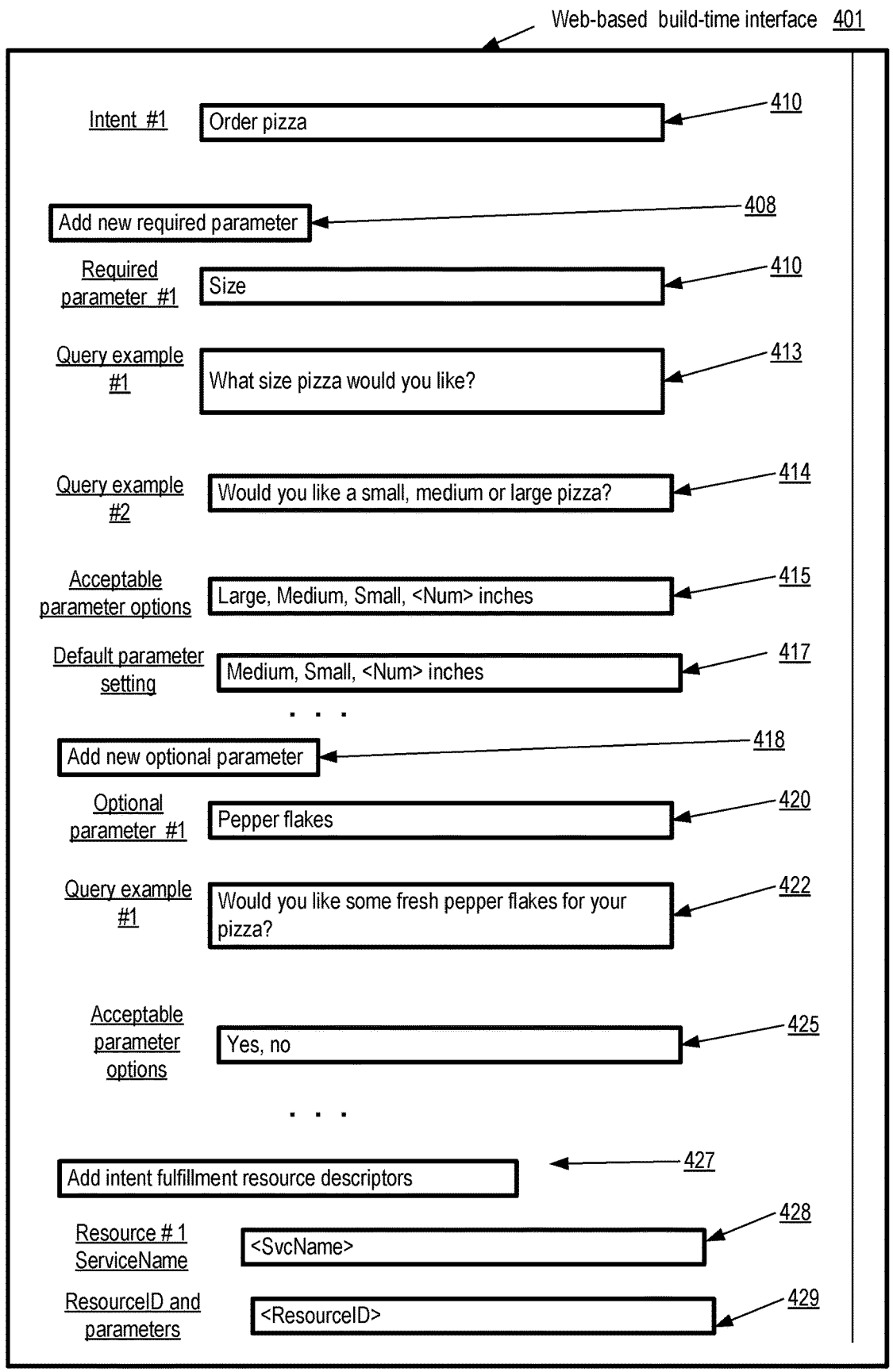
FIG. 4 illustrates an example graphical user interface which may be used to determine parameter values of an intent associated with a dialog-driven application, according to at least some embodiments.

FIG. 4 illustrates an example graphical user interface which may be used to determine parameter values of an intent associated with a dialog-driven application, according to at least some embodiments. Such an interface may be reached, for example, in one embodiment as a result of an application developer's clicking on an element similar to the "Add intent parameter dialog" element 319 of FIG. 3. Within the web-based build-time interface 401, the name of the intent for which parameter values are to be determined may be shown in element 410. The application developer may add two categories of parameters to the intent in the depicted embodiment: required parameters, for which respective values have to be obtained in order for the task associated with the intent to be fulfilled, and optional parameters, for which values need not necessarily be provided. To add a new required parameter, element 408 may be used. Examples of various query word strings that may be used to elicit a value of the parameter may be entered using elements 413 and 414. Acceptable values for the parameter may be indicated via element 415, and a default value may be indicated via element 417 in the depicted embodiment.

Element 418 may be used to add queries for an optional parameter in the depicted embodiment. The name of the optional parameter may be indicated via element 420, query word strings to be used to request a value for the parameter may be indicated via elements such as 422, and acceptable values for the parameter may be indicated via element 425 in the depicted example. In one embodiment, the application developer may add as many new parameters and the corresponding queries and acceptable values as desired.

In some embodiments, the application developer may use the interfaces of the application management service to explicitly or implicitly provide input regarding the order in which parameter values are to be ascertained, without having to provide source code which implements the ordering. For example, in one embodiment the sequence in which parameters and associated queries are specified at application build time may correspond to the sequence in which the parameter values are determined at run time. In another embodiment, the application developer may rearrange the sequence in which parameter values are to be obtained, e.g., by dragging and dropping icons representing the different parameters as discussed below in the context of FIG. 5, or by adding arrows indicating the sequence in which parameter values are to be determined.

After all the parameters that the developer wishes to include with an intent have been specified, in one embodiment the developer may also provide information about one or more resources and/or services to be used to perform the tasks corresponding to the intent. For example, in the example scenario depicted in FIG. 4, element 427 may be used to initialize a descriptor for a task fulfillment resource. In some embodiments, at least some of the resources used for intent fulfillment tasks may be associated with a network-accessible service. The name of the service may be provided via element 428 in the depicted example, and the identifier of the resource to be used (e.g., a URI) (as well as a set of parameters to be passed to the resource) may be indicated via element 429. Several different resources (which may be part of different services) may be used in combination in some embodiments for a given intent in one embodiment—for example, a first program may be run at one service to initiate the task, and the result from that first program may be provided to a second program run at another service to complete the task. Just as the sequence in which parameter values are obtained may be indicated without providing source code, in some embodiments the sequence in which multiple resources are to be utilized may be indicated by an application developer without using source code in various embodiments.

Figure 5:
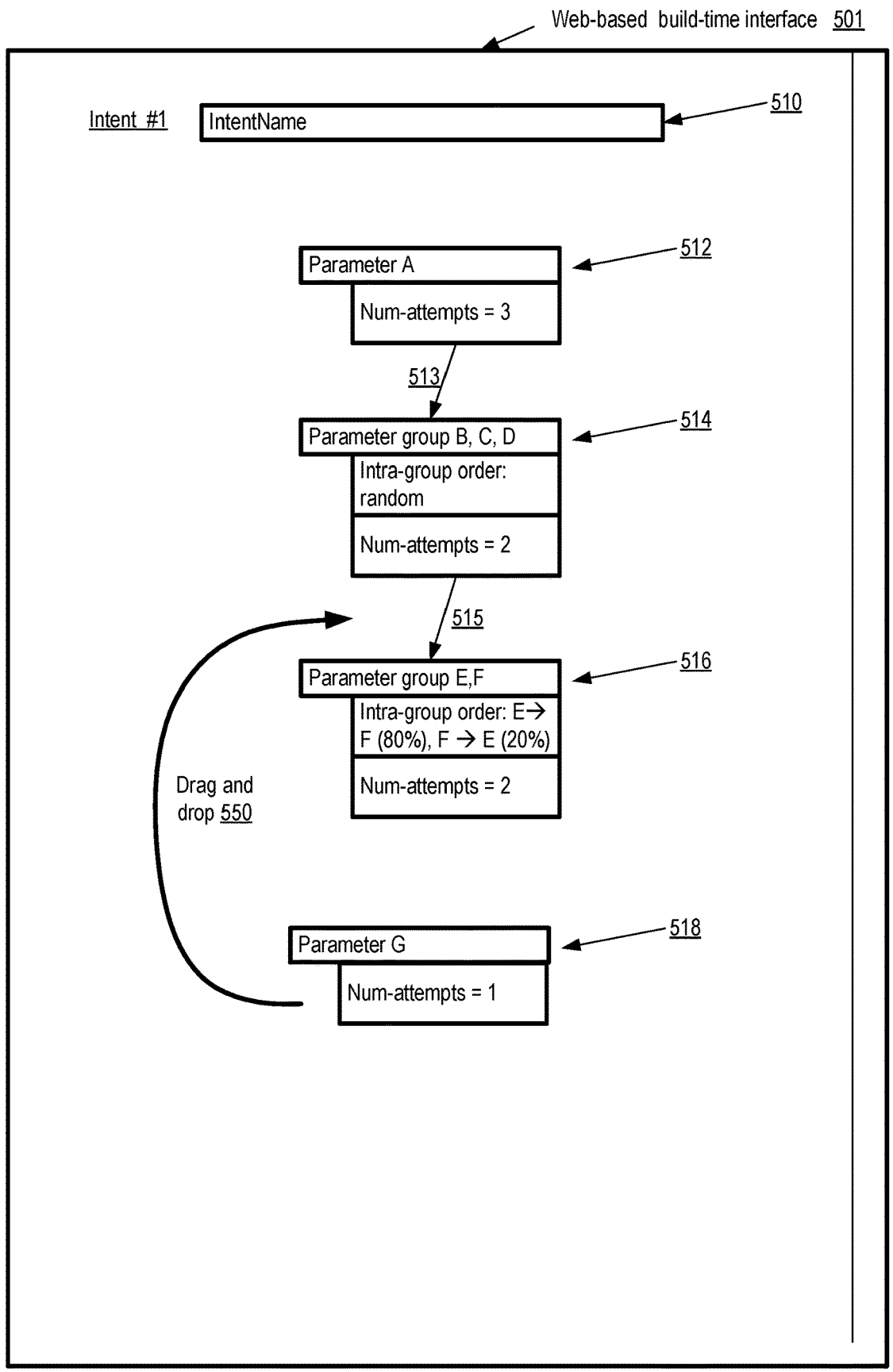
FIG. 5 illustrates an example of the use of a drag-and-drop operation to arrange the order in which values for parameter values may be determined for a dialog-driven application, according to at least some embodiments.

FIG. 5 illustrates an example of the use of a drag-and-drop operation to arrange the order in which values for parameter values may be determined for a dialog-driven application, according to at least some embodiments. In the depicted embodiment an intent 510 (with name "IntentName") associated with a particular dialog-driven application being developed using a web-based build-time interface 501 may have parameters A, B, C, D, E, F, and G for which values are to be obtained from an end user via natural-language interactions. The application developer may use the interface 501 to arrange and re-arrange the sequence in which parameter values are to be ascertained, and to provide various other details regarding the multi-step dialog to be used to obtain the values (including for example how many attempts are to be made to obtain the value of a given parameter before abandoning the corresponding dialog step or the entire dialog).

As shown by graphical element 512 of the interface 501, the developer may indicate that a value for parameter A is to be determined first in the depicted embodiment, and that three attempts (potentially using slightly different query strings) may be made to obtain parameter A's value. After a value for A is obtained, values for a group of parameters B, C and D may be obtained, as indicated by element 514 and arrow 513. Queries regarding B, C and D may be issued in random order, and two attempts may be made to obtain each of the values in the depicted embodiment. Next, values for parameters E and F may be obtained, as indicated by element 516 and arrow 515. 80% of the time, the value of E may be requested before the value of F is requested; the remaining 20% of the time, the value of F may be requested before the value of E.

The application developer may use drag-and-drop action 550 to insert the element 518 between the elements 514 and 516 in the depicted embodiment, to indicate that the value of parameter G should be determined after the values of parameters B, C and D and before the values of parameters E and F at run-time. After the element 518 has been positioned between elements 514 and 516, new arrows indicating the ordering may replace the arrow 515—one new arrow leading from element 514 to element 518, and another leading from element 518 to 516.

It is noted that other types of programmatic interfaces and interface control elements than the examples shown in FIG. 3, FIG. 4 and FIG. 5 may be used in various embodiments to enable the development of dialog-driven applications without requiring source code to be provided by developers.

Voice and Text-Related Settings

Figure 6:
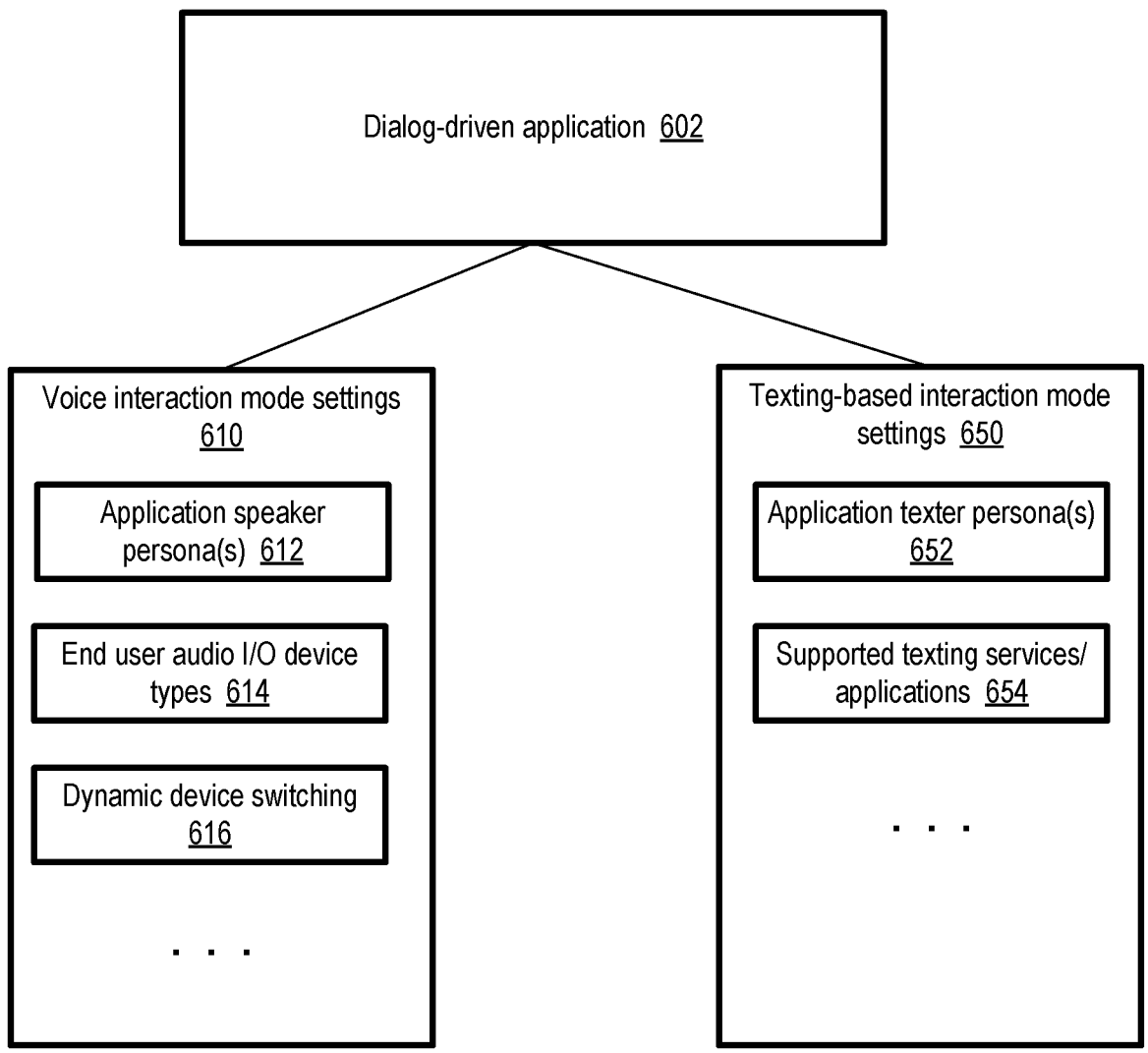
FIG. 6 illustrates example voice-related settings and text-related settings which may be specified by a developer of a dialog-driven application at build time, according to at least some embodiments.

FIG. 6 illustrates example voice-related settings and text-related settings which may be specified by a developer of a dialog-driven application at build time, according to at least some embodiments. As mentioned earlier, a given dialog-driven application may be capable of responding to both voice as well as text message input in some embodiments. An application developer may indicate, via the application management service's programmatic interfaces, the types of interactions for which the application is intended in various embodiments. In some embodiments, slightly different versions of the application may be generated for voice and text interactions, e.g., with common business logic among the versions and different communication-related elements, while in other embodiments a single version of the application may be developed for both types of interactions.

In the depicted embodiment, a dialog-driven application 602 may support both voice-based and text-based interactions. Voice mode interaction settings 610 indicated by the application developer may include, among others, one or more application speaker persona(s) 612, the audio capture and generation device types 614 to be supported by the application for end user interactions, and whether dynamic device switching 616 is supported. An application speaker persona 612 may comprise settings for the gender and age to be simulated by the application's "voice" (i.e., whether the application is to appear to have a man's voice, a woman's voice, a child's voice, etc.), the level of informality to be used by the application during interactions with end users, whether any particular accent is to be used when voicing the application's words, and so on. The audio device types 612 may indicate the kinds of speech sensors and speech generators which are to be used for the dialogs with the end user, which may influence the ASR/NLP algorithms selected for the application. Dynamic switching setting 614 may govern whether an individual can switch between devices during the middle of an interaction session with the application—for example, if dynamic switching between a registered set of devices is permitted, an interaction session to order a pizza may be begun using a smart phone, and completed using a voice-based assistant device. Dynamic switching may be useful, for example, when the end user moves from one room of a building or house to another while interacting with a given application, or moves from a vehicle to a building.

Texting-based interaction mode settings 650 may include, for example, a texting persona 652 for the application, as well as a list 654 of supported services, input interfaces or applications which can be used for sending/receiving short messages or texts in the depicted embodiment. Texting-based interactions may also be referred to as "chat"-based interactions in various embodiments. The texting persona 652 may govern, for example, the extent of formality of the texting language used by the application, such as whether and how often emoticons, emojis or other graphical symbols are to be used. The list 654 of supported texting applications/services may include, for example, various social media applications which provide input interfaces for (typically) short text messages in some embodiments.

In at least one embodiment, the particular persona to be used for voice or texting interactions with an individual end user may be selectable by the end user, e.g., as part of the settings of the dialog-driven application. In some embodiments, various parameters of the personas used for a given end user may be adapted or modified over time by the application management service, e.g., based on an analysis of the end user's own language informality level and/or other factors. In one embodiment, different personas may have different regional accents or local speech/text usage mannerisms, and a particular persona may be selected for an end user based on a determination of the end user's geographical location or other factors.

Use of Provider Network Services

Figure 7:
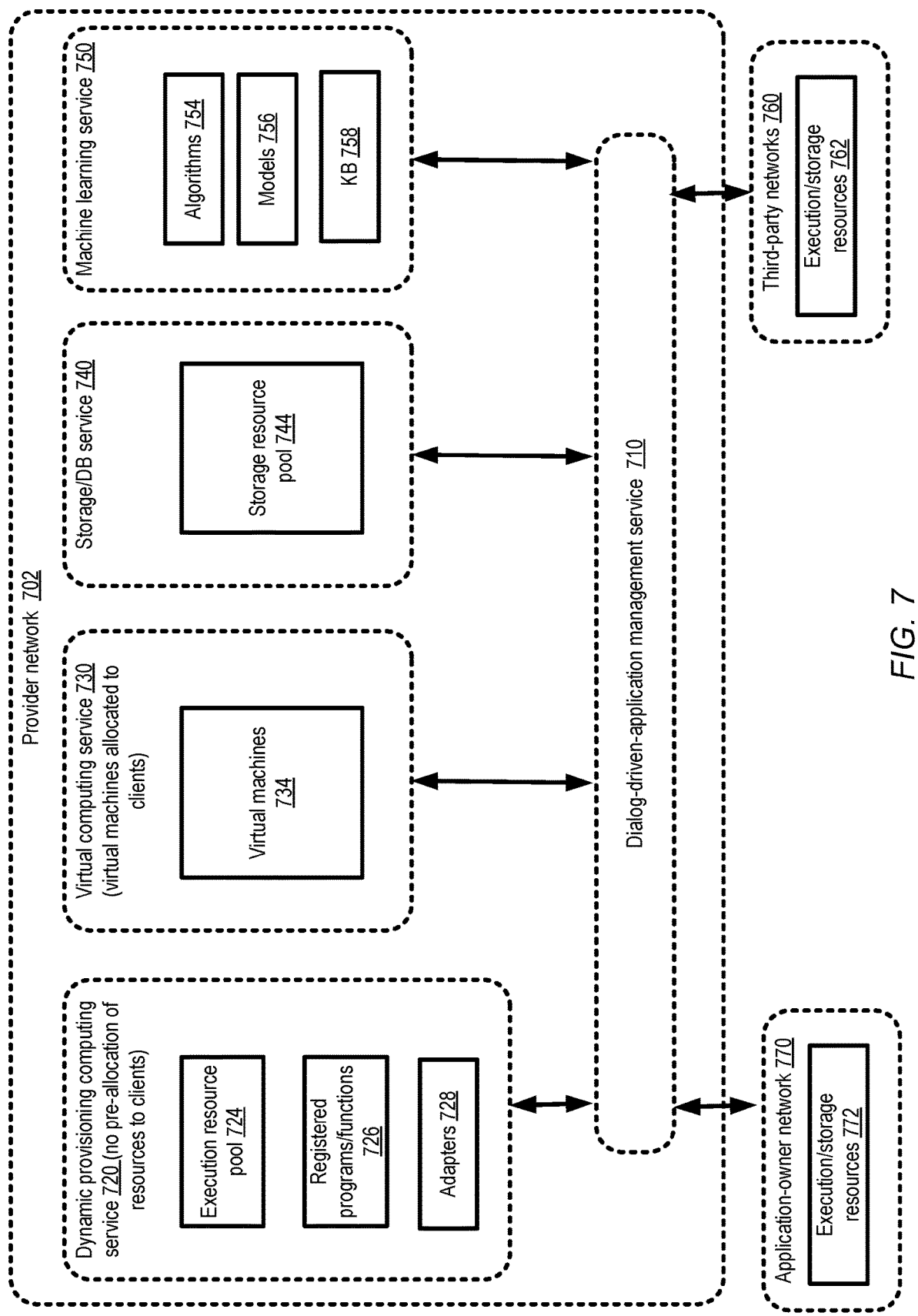
FIG. 7 illustrates an example provider network in which an application management service may be implemented, according to at least some embodiments.

FIG. 7 illustrates an example provider network in which an application management service may be implemented, according to at least some embodiments. As shown, in one embodiment provider network 702 may comprise a dynamic provisioning computing service 720, a virtual computing service 730, a storage or database service 740 and a machine learning service 750 in addition to an application management service 710. In the depicted embodiment, the application management service 710 may utilize one or more of the other services, for example to execute the fulfillment tasks associated with various intents or tasks of dialog-driven applications.

In one embodiment, a dynamic provisioning computing service 720 may enable clients to register executable programs for execution without pre-allocating execution platforms for the clients (and hence may sometimes be referred to as a "server-less" computing service). A program developer may submit a program at service 720 and indicate one or more triggering conditions which are to cause the execution of the program. Instead of reserving or provisioning compute resources for the client in advance, the service 720 may simply select compute resources for a registered program 726 from a pool 724 of execution platforms whenever execution of the program is triggered. The client may not even be aware of the kind of virtual or physical machine used to execute the program, and may simply be provided with the result of the execution. As such, clients of the dynamic provisioning computing service may not have to be concerned with identifying the number or computing capacities of platforms to be used for their programs, and may only be charged for the amount of computing actually performed when their programs are executed (measured, for example, in relatively fine-grained increments of seconds or even fractions of seconds of computation) in at least some embodiments. The computing resources offered by such a service 720 may be used for implementing the task fulfillment programs for intents of some kinds of dialog-driven applications in one embodiment, especially if the workload of the application tends to change dynamically. In the depicted embodiment, dynamic provisioning service 720 may also make a number of adapters 728 accessible for the registered programs, enabling the registered programs to utilize resources external to the service 720. As a result, a program registered for execution at service 720 may be able to access resources, for example, at other services of the provider network and/or outside the provider network.

In contrast to the dynamic provisioning service 720, in the depicted embodiment the virtual computing service 730 may pre-allocate computing resources (e.g., virtual machines) to its clients in a somewhat more static fashion, e.g., for specified time intervals, and enable the clients to run programs on the allocated virtual machines. In at least some embodiments, programs running on such virtual machines may be invoked for implementing the fulfillment tasks of dialog-driven applications. Some such programs may implement web services interfaces in one embodiment, enabling a given program to be utilized (e.g., to fulfill a task intent) by transmitting commands to an HTTP (HyperText Transfer Protocol)-based address associated with the program. In one embodiment, a distributed application (e.g., an application for making travel-related reservations, or for managing the workflow of customer support tasks associated with various products produced by an enterprise) may have originally been implemented at the virtual computing service without including the necessary hooks or communication modules for dialog-driven interactions. Various infrastructure management capabilities supported at the virtual computing service, such as automated scaling and load balancing, may be utilized for the distributed application. The owner of the distributed application may wish to add the dialog-driven interaction components to such an application. In one embodiment, the application management service 710 may enable the dialog-related components to be generated and integrated with the pre-existing application without substantial additional investment of programming effort. Intent task fulfillment programs run at the virtual computing service 720 and/or the dynamic provisioning computing service 710 may invoke each other (or other programs at other services) in some embodiments—that is, a given task fulfillment program may not be restricted to utilizing resources of a given service of the provider network.

In various embodiments, one or more storage and/or database services 740 may also be utilized for dialog-driven applications. For example, data sets used for task fulfillment may be stored at such services, profile information for end users of dialog-driven applications may be stored, and so on. In at least one embodiment, an executable representation of a dialog-driven application may comprise invocations of programmatic interfaces of the storage or database service.

In one embodiment a provider network may include a machine learning service 750 which can be utilized by various other services and/or by external clients directly. The machine learning service 750 may provide natural language understanding (NLU) capabilities which in turn may depend on a combination of automated speech recognition (ASR) and natural language processing (NLP) components in the depicted embodiment. A wide variety of algorithms 754 and models 756 may be accessed from the machine learning service in such embodiments, including for example various classification and regression algorithms, artificial neural network-based algorithms (including "deep learning" neural network algorithms), and so on. In addition, a knowledge base 758 which captures records of previous experiences with machine learning tasks, and which can therefore be utilized to select suitable parameters and hyperparameters for various algorithms and models may also be implemented at the machine learning service 750. In some embodiments, the ASR components of the machine learning service may comprise a number of finite state transducers (FSTs), associated general or user-specific language models and/or acoustic models. The ASR components may, for example, detect speech based on signals received at an end-user device associated with a dialog-driven application, transform the speech signals into text, and provide the text as input to the natural language processing components. The natural language processing components may implement, for example, algorithms for named entity recognition, intent classification, and result ranking (e.g., associating scores with end user utterances indicating the extent to which the utterances match expected word strings for various stages of the dialogs used for setting intent parameters) in one embodiment. As discussed below in further detail, the machine learning service 750 may also be used to automate the expansion or enhancement of lexicons associated with dialog-driven applications in some embodiments, based for example on log record analysis, cross-application lexicon analysis, and/or analysis of other language usage corpora.

For some intents of dialog-driven applications developed using service 710, in one embodiment fulfillment tasks may be implemented at resources outside the provider network, e.g., at execution or storage resources 772 located within application-owner networks 770 or at execution or storage resources 762 located in third-party networks 760 (e.g., networks owned or managed by a third party application vendor or service vendor, other than the entity which develops/owns the dialog-driven application and other than the provider network operator). Other resources or services inside or outside the provider network may be used for dialog-driven applications in various embodiments. As mentioned earlier, in one embodiment the application management service 710 may simplify the integration required to utilize the various types of resources, e.g., by inserting appropriate communication modules, formatting modules, data structure transformation code, plug-in modules and the like into dialog-driven applications without requiring application developers to supply source code for the integrations.

Programmatic Entities Used for Dialog-Driven Applications

Figure 8:
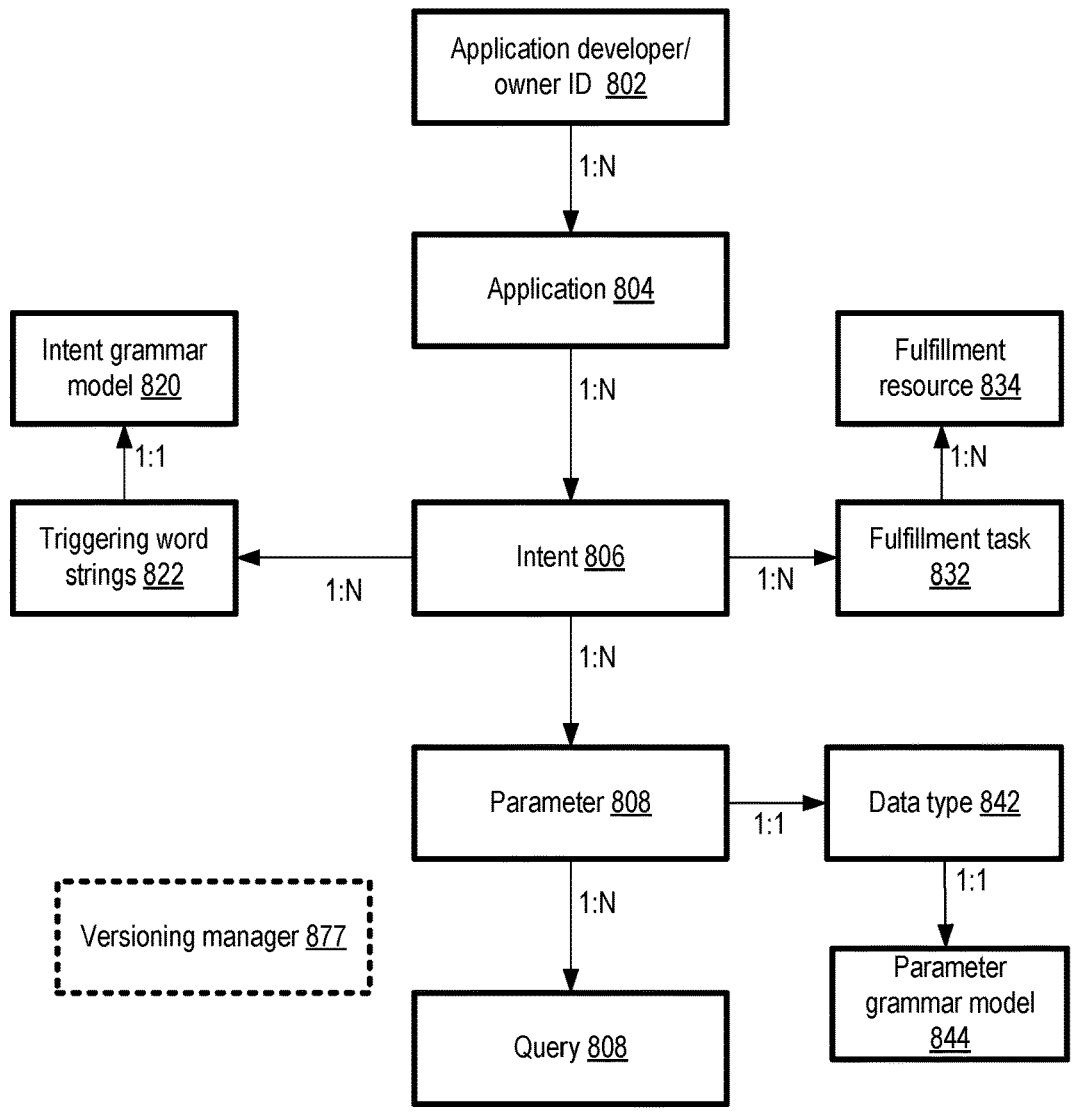
FIG. 8 illustrates examples of entities which may be represented in a dialog-driven application, according to at least some embodiments.

FIG. 8 illustrates examples of entities which may be represented in a dialog-driven application, according to at least some embodiments. Individual ones of the entities may be represented by allocating respective memory objects, which may be stored in persistent storage associated with the application management service in various embodiments. As shown, a given application developer/owner with an identifier (ID) 802 may create any desired number of distinct applications 804 using the service in the depicted embodiment (the notation 1:N and the direction of the arrow between the developer/owner ID 802 and the application 804 indicates this 1:N relationship).

A given application 804 may have multiple intents 806 associated with it in one embodiment. Each intent may have one or more triggering word strings 808 (e.g., sentences or phrases comprising one or more words in a particular language) corresponding to an intent grammar model 810 in the depicted embodiment. The grammar model may comprise, for example, information about the expected ordering of individual words of the strings, variants of parts of speech that may be used, and so on. In one embodiment, each intent 806 may correspond to one or more tasks 832 which are to be fulfilled once all the required parameter values of the intent are obtained or set. A given task may in turn require the use of one or more fulfillment resources 834 in the depicted embodiment.

As discussed earlier, a given intent 806 may have one or more parameters 808 in some embodiments. Each parameter may have an associated data type 842 and a parameter grammar model 844 in the depicted embodiment (analogous to the intent grammar model 810, but applicable for language to be used to determine the value of a given parameter). One or more queries 808 may be indicated by application developers for the dialog to be used to obtain the corresponding parameter value in the depicted embodiment.

In at least some embodiments, the application management service may implement respective application programming interfaces (APIs) which can be used to create, delete, read, write, or modify individual ones of the entities shown in FIG. 8. For example, in one embodiment, with respect to intents, the APIs createIntent( ), deleteIntent( ), getIntent( ), setIntent( ), and updateIntent( ) may be implemented, for an intent parameter the APIs createIntentParameter( ), deleteIntent( ), getIntent( ), setIntent( ), and updateIntent( ) may be implemented, and so on. In embodiments in which graphical user interfaces similar to those shown in FIG. 3 are made available to developers, the use of the graphical interface control elements (such as the "Add New Intent" control 308) may result in the invocation of corresponding APIs (e.g., createIntent( ) in the case of "Add New Intent"). In some embodiments, programmers may use the APIs to create entities for their dialog-driven applications, e.g., in addition to or instead of using graphical user interfaces.

In some embodiments, a number of versions of at least some of the different entities shown in FIG. 8 may be created. For example, in the case of a dialog-driven application which includes an intent for ordering a pizza, some pizza toppings or crust types may be more popular in different geographical regions or countries, while much of the business logic associated with ordering the pizza may be independent of geography. Consequently, different versions of the intent associated with ordering the pizza may be created for different regions. A versioning manager 877 of the application management service may keep track of dependencies between different versions of various entities in one embodiment, and ensure that the executable versions of the dialog-driven applications are generated using consistent combinations of entity versions. Entities other than those shown in FIG. 8 may be represented in dialog-driven applications in various embodiments.

Intent Chaining

Figure 9:
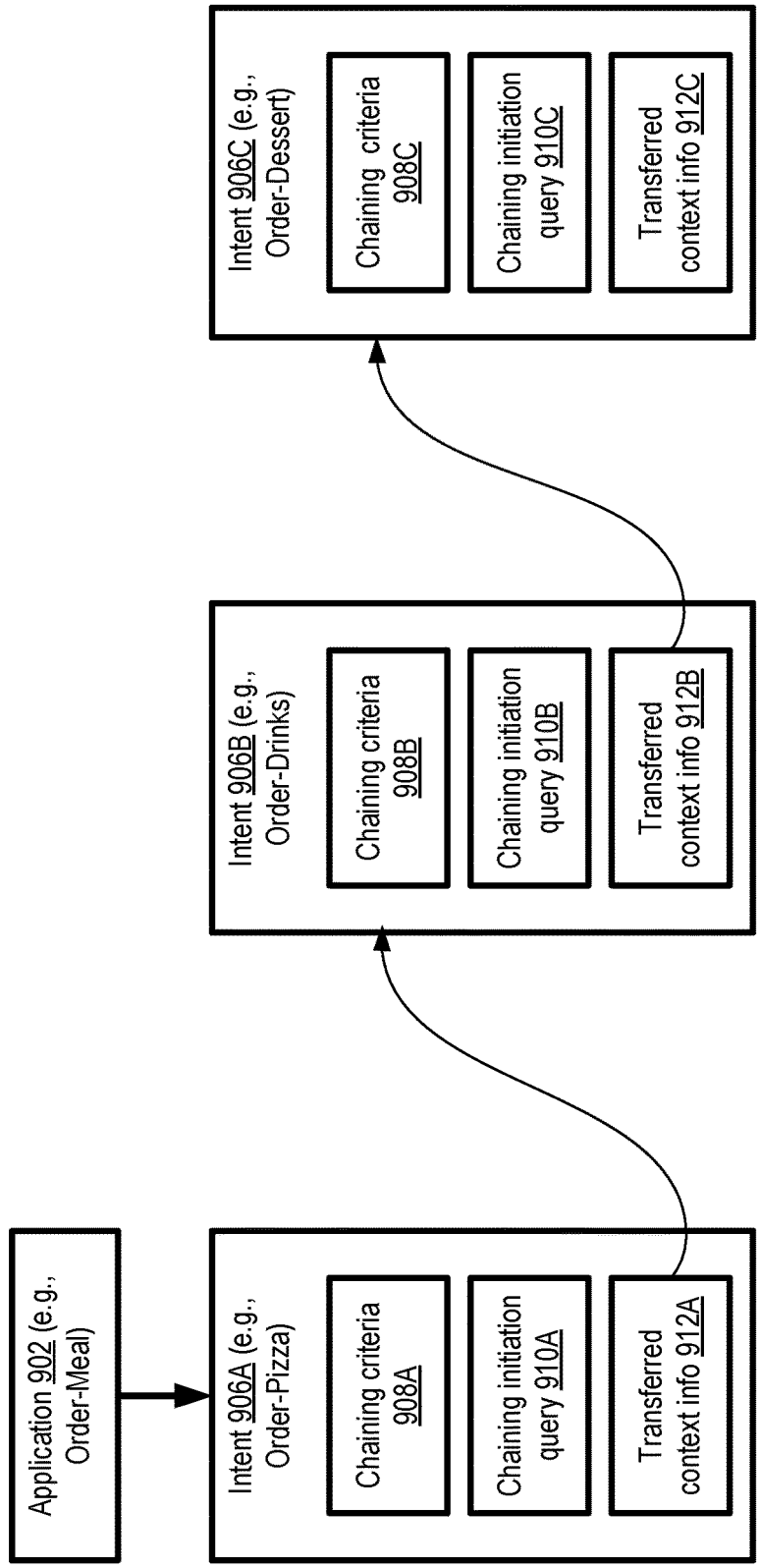
FIG. 9 illustrates examples of intent chaining for a dialog-driven application, according to at least some embodiments.

In some embodiments, a given application may comprise a plurality of intents, with the dialog and business logic for one intent being triggered by, or chained to, the dialog or business logic of another intent. The application development service may facilitate the generation of such applications in one embodiment by, for example, enabling developers to indicate the type of contextual information which is to be passed between the intents FIG. 9 illustrates examples of intent chaining for a dialog-driven application, according to at least some embodiments.

As shown, a particular example application 902 ("Order-Meal") may have at least three constituent chained intents 906A, 906B and 906C in the depicted embodiment. Intent 906A may correspond to the task of ordering a pizza, e.g., as a main course of a meal. Intent 906B may correspond to ordering drinks for the meal, and intent 906C may correspond to ordering a dessert. The application developer may indicate the order in which the intents are to be chained—e.g., whether the parameters for ordering drinks are to be determined before or after the parameters for ordering dessert—using a graphical programmatic interface in some embodiments. For example, the positions of respective icons corresponding to the intents may be rearranged relative to one another without providing corresponding source code.

In some embodiments, a developer may indicate respective sets of chaining criteria 908 (e.g., criteria 908A, 908B and 908C) corresponding to each intent to the application development service, specifying conditions (if any) which are to be verified before initiating the dialog for the next intent of the chain. Such conditions may be used, for example, to avoid certain combinations of incompatible intents, to avoid repetitions of the same intent dialogs multiple times, and so on. For example, if an end user has already directly or indirectly indicated that they are unlikely to order dessert, the dessert-ordering dialog may not be initiated. Respective sets of chaining initiation queries 910 (e.g., 910A, 910B, or 910C) may be specified by the developer, such as the query "Would you like to order some drinks with your pizza?" to initiate the dialog for intent 906B in the depicted scenario. The developer may also indicate context information 912 (e.g., 912A, 912B or 912C) that should be passed from one intent to the next intent in the chain in some embodiments. The context information may, for example, include one or more parameter values obtained from the end-user or set using profile-based personalization, as well as other metadata such as (in the case of a meal order) a delivery address, phone number etc. The application management service may generate the code required to transfer the context information at run time from one intent dialog to the next intent dialog in one embodiment, and incorporate the context transfer code into the executable version(s) of the application. With respect to chained intents, in various embodiments the application management service may include, within the executable representation for the application, logic or instructions to determine that after the steps of a particular interaction to determine parameters for one intent of a chain have been completed, another interaction to determine a value of one or more parameters of the next intent of the chain is to be initiated automatically.

Inter-Parameter Logical Relationships

Figure 10:
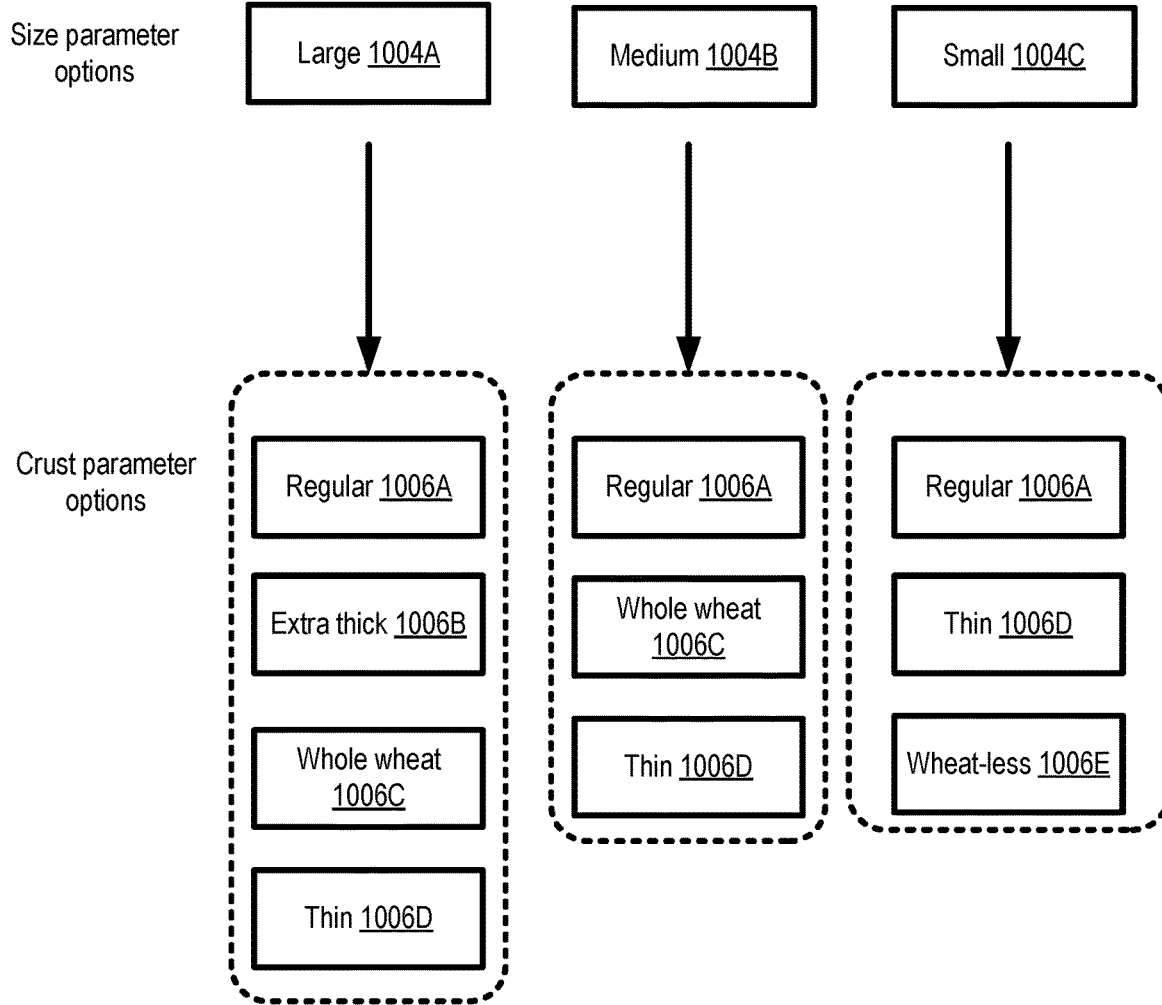
FIG. 10 illustrates examples of conditional parameter value ranges of a dialog-driven application, according to at least some embodiments.

In some scenarios, various parameters associated with a given intent of a dialog-driven application may be interrelated—e.g., a particular value assigned for one parameter may constrain or restrict possible values which can be assigned to another parameter. In various embodiments, a developer may be able to indicate such logical relationships to the application management service, e.g., without providing the corresponding source code. FIG. 10 illustrates examples of conditional parameter value ranges of a dialog-driven application, according to at least some embodiments.

In the depicted scenario, a pizza size parameter (associated with an intent to order a pizza) may take on one of three values: large 1004A, medium 1004B and small 1004C, selected based on a verbal or text-based interaction with the end user. Depending on the size selected by the end user, the kind of crust which the pizza maker can use to the pizza may differ. Thus, the crust type parameter of the pizza-ordering intent may be constrained by the size parameter. The developer of the dialog-driven application may be able to indicate the constraints using the programmatic interfaces of the application development service in the depicted embodiment.

If the size is set to large, the following four crust types may be selectable by the end user—regular 1006A, extra thick 1006B, whole wheat 1006C, or thin 1006D. If a medium size is selected, a regular, whole wheat or thin crust may be selected, and if a small pizza is desired, the available options for the crust type may include regular, thin and wheat-less 1006E in the depicted example. In some embodiments, the relationships between parameters may be indicated by an application developer by populating respective regions of a graphical user interface with icons or words indicating the permissible values. If, over time, the pizza vendor wished to expand the set of choices for one or more parameters, or to indicate a different set of inter-parameter constraints, the application developer may easily rearrange the permissible values using the application management service's interfaces in one embodiment, and cause a new executable version of the application to be generated and deployed.

In various embodiments, the application management service may automatically generate word strings that indicate the allowed values for a given parameter, in view of the information that has already been provided. For example, if an end user has indicated that the size of the pizza to be delivered is small, the system may automatically indicate (e.g., in a step of the dialog which acknowledges the selected pizza size) the set of permissible crust parameter values acceptable for small pizzas. In one embodiment, in scenarios in which there is a non-trivial chain of parameter value range dependencies, numerous different sentences or word strings may be generated for enumerating the permissible values of parameters by the service, relieving the application developer from having to generate the sentences.

Enhancing Lexicons

Figure 11:
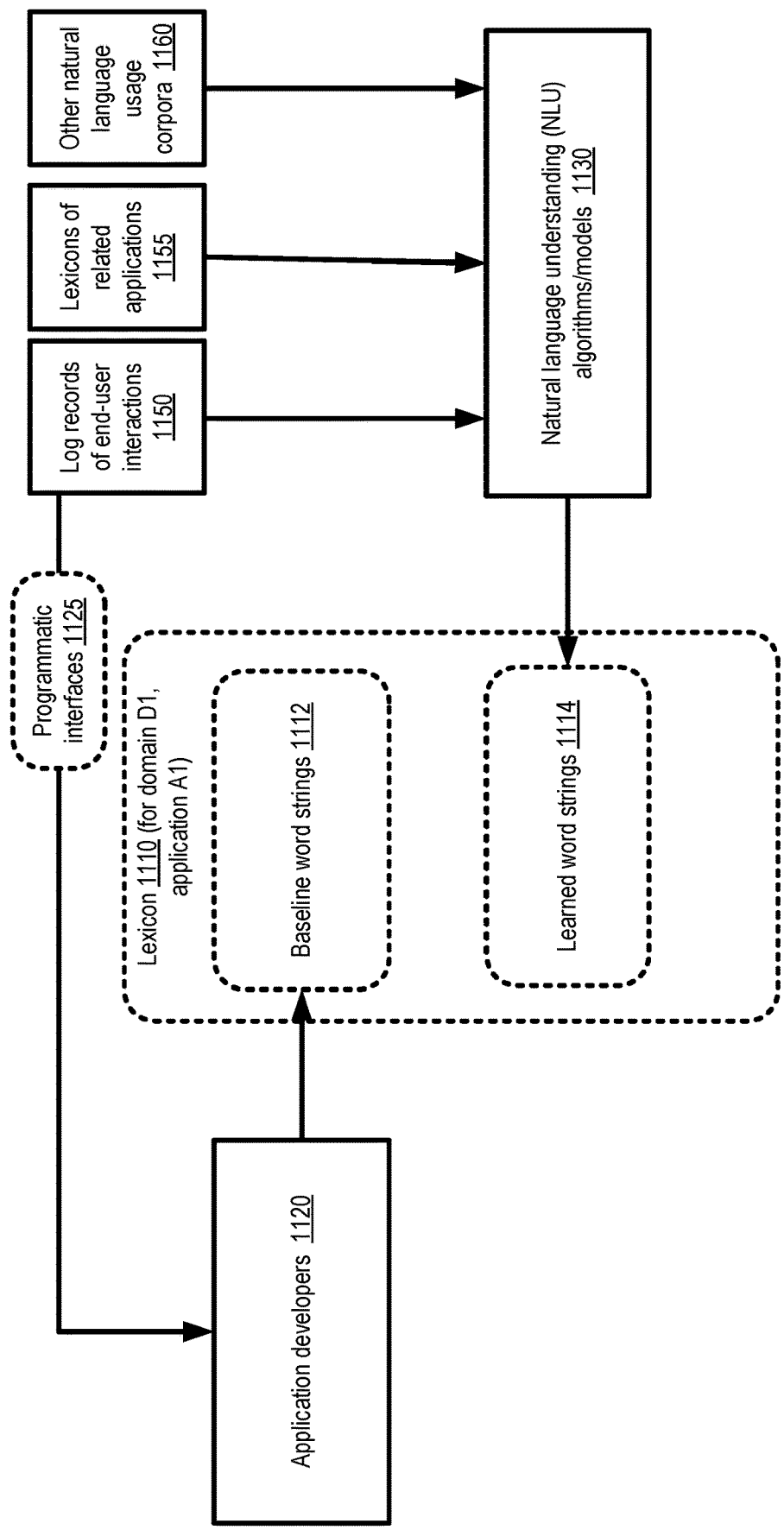
FIG. 11 illustrates an example of the use of natural language understanding resources to expand a lexicon associated with a dialog-driven application, according to at least some embodiments.

FIG. 11 illustrates an example of the use of natural language understanding resources to expand a lexicon associated with a dialog-driven application, according to at least some embodiments. In the depicted embodiment, a lexicon 1110 for a dialog-driven application A1 of a domain D1 comprises a set of baseline word strings 1112 initially provided by an application developer for use in one or more steps of dialogs used for parameter value determination. After the application is deployed for execution, log records of end user interactions 1150 may be stored by the application management service in the depicted embodiment. During a given interaction session with an end user, the words or phrases used by the end user may not always match the baseline word strings. As mentioned earlier, in one embodiment natural language understanding (NLU) resources such as algorithms and models 1130 may be used at application run time to determine scores indicating the extent to which a given phrase or sentence matches an expected phrase or sentence, and if the score for a particular phrase or sentence is above a threshold, the corresponding parameter determination step may be performed. The log records 1150 of the interactions may later be analyzed by the NLU resources 1130 in one embodiment to identify additional word strings (which may therefore be referred to as "learned" word strings) which may be appropriate for various steps of the dialogs. At least some of the learned word strings 1114 identified by the algorithms may be inserted into the lexicon 1110 in some embodiments, thereby potentially simplifying the task of matching end user utterances or texts during future interactions.

In addition to examining log records 1150 (which may in some cases pertain to related applications, and may not necessarily be limited to records of interactions associated with the same application A1), in some embodiments NLU algorithms may utilize other natural language interaction corpora 1160 which may be considered relevant to the application domain. For example, in one embodiment, with respect to applications pertaining to ordering food, records of restaurant reviews may be examined, or records of social media interactions, news articles and the like may be analyzed. In one embodiment, lexicons 1155 of related applications (e.g., applications for a similar problem domain or the same problem domain) may be analyzed to identify additional learned word strings for inclusion in the lexicon 1110. In various embodiments, the timing of the insertion of learned word strings may vary with respect to the timing of the deployment or execution of the dialog-driven application. For example, in one embodiment in which NLU models are provided other lexicons 1155 or corpora 1160 as input for training, learned word strings may be inserted into lexicon 1110 even before the first deployment of the application A1. In some embodiments, after new learned word strings are added, the application A1 may be re-deployed for execution at one or more execution platforms to enable the enhanced lexicon to be used. In one embodiment, the NLU resources 1130 may first be used to generate portions of the first version of a dialog-driven application (such as a portion involved in managing the flow of natural language interactions to obtain parameter values), and then be used to enhance the dialog-driven application as more examples of natural language interactions become available. Over time, in one embodiment, as more and more applications are generated using the application management service, and the example natural language interactions of the applications are used to train and re-train the NLU models, the ability of the service to handle dialogs may improve for applications of various problem domains. In one embodiment, machine learning algorithms or models which may not necessarily be classified as natural language understanding algorithms or models may be used to develop and/or enhance applications.

In at least some embodiments, application developers 1120 may be able to access the log records of actual end user interactions, using various types of programmatic interfaces 1125 implemented by the application management service such as web-based consoles, application programming interfaces, command-line tools and the like. The application developers may add new word strings or change word strings of the application dialogs based on examination of the log records if desired.

Example Application Domains

Figure 12:
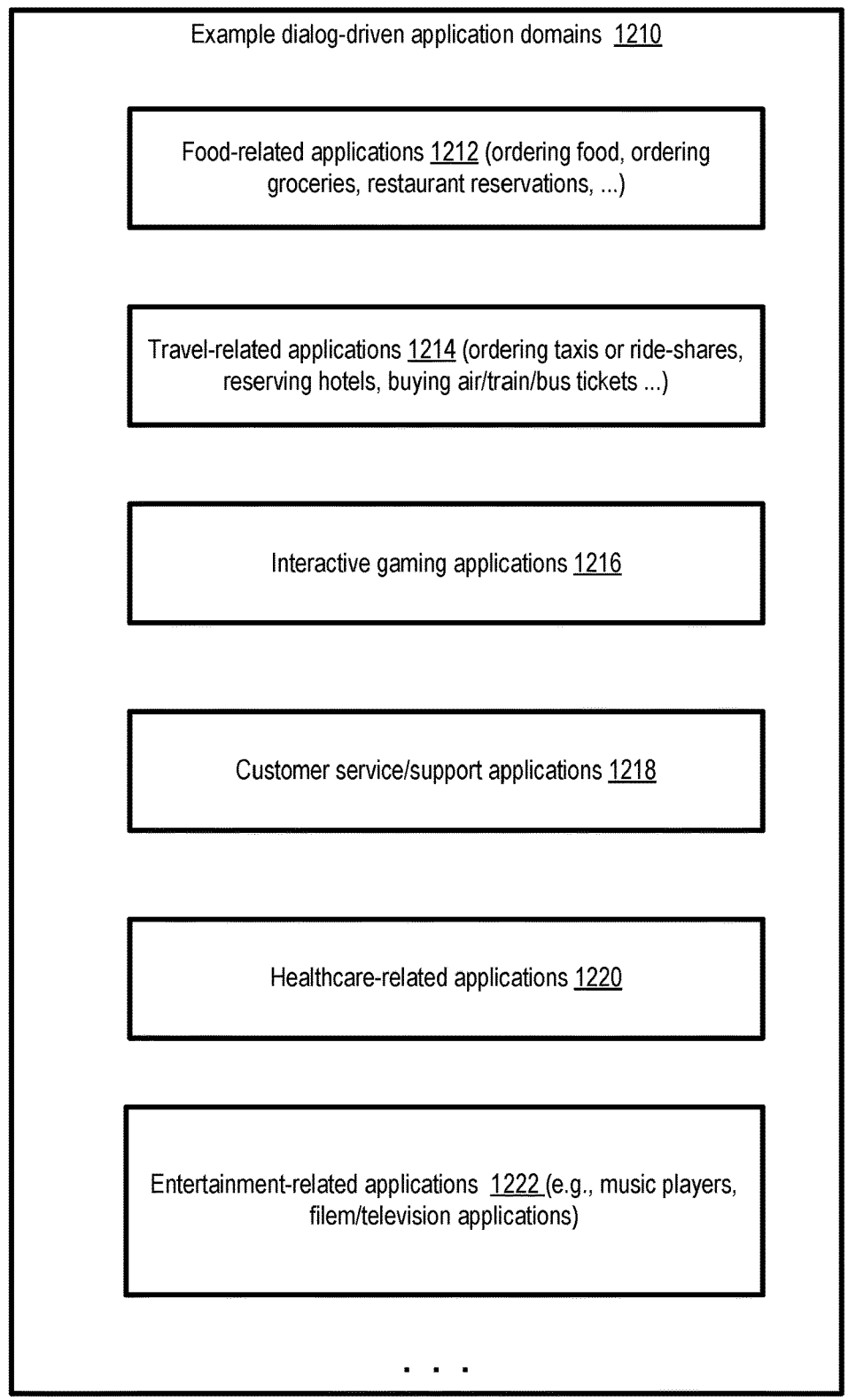
FIG. 12 illustrates example domains of dialog-driven applications which may be developed and deployed using an application management service, according to at least some embodiments.

FIG. 12 illustrates example domains of dialog-driven applications which may be developed and deployed using an application management service, according to at least some embodiments. As shown, in one embodiment, domains 1210 may include, among others, food-related applications 1212 (such as ordering food, ordering groceries, making restaurant reservations), travel-related applications 1214 (such as ordering taxis, reserving hotel rooms, buying airline/train/bus tickets), interactive gaming applications 1216, customer service/support applications 1218, healthcare-related applications 1220 (e.g., applications for performing an initial level of diagnosis of a potential non-emergency health problem), and/or entertainment-related applications 1222 (e.g., applications for playing music, television shows, films, etc.).

In some embodiments, numerous types of tasks whose requirements may be indicatable via informal conversational interactions may be considered candidates for fulfillment via dialog-driven applications of the kind discussed herein. In some cases, the dialog-driven interactions may constitute a preliminary part of a larger application workflow, with the latter portions of the workflow sometimes being completed using other means (including, potentially, interactions with individuals trained to perform the tasks being requested). For example, in one embodiment a multi-step dialog of a customer support application for a particular product P may lead to a narrowing down of the scope of a problem being experienced by the end user. Once the specifics of the end user's problem have been identified in such a scenario, control may be passed to a customer support representative skilled in the area in which the problem was encountered.

Methods for Developing and Deploying Dialog-Driven Applications

Figure 13:
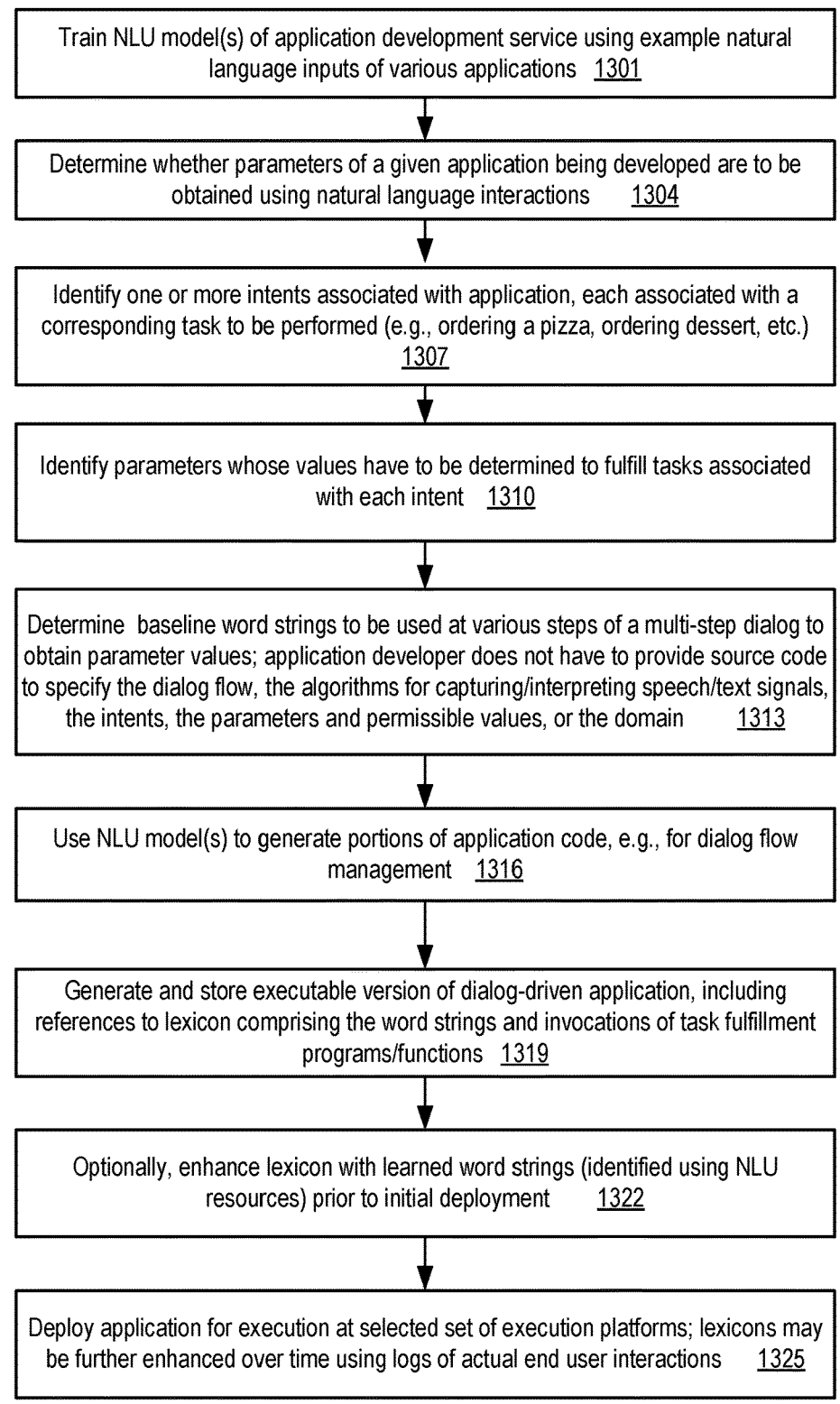
FIG. 13 is a flow diagram illustrating aspects of operations which may be performed at a network-accessible service for developing dialog-driven applications, according to at least some embodiments.

FIG. 13 is a flow diagram illustrating aspects of operations which may be performed at a network-accessible service for developing dialog-driven applications, according to at least some embodiments. As shown in element 1301, in one embodiment one or more natural language understanding models may be trained at the service, e.g., using respective examples of natural language inputs associated with various applications developed using the service. Such example inputs may be provided by the developers of those applications, and/or may be collected using records of end user interactions with the applications in one embodiment.

A determination may be made in the depicted embodiment as to whether parameter values associated with one or more tasks of a given application being developed using the service are to be obtained using natural language interactions (element 1304). One or more intents associated with the application may be identified using input provided by an application designer or developer (element 1307) in some embodiments. Individual ones of the intents may correspond to respective tasks that are to be accomplished on behalf of end users of the application, such as ordering a pizza, ordering a dessert item, etc. In order to fulfill a task corresponding to a given intent, in one embodiment values of one or more parameters of the intent may have to be determined—e.g., in the case of an intent for ordering a pizza, the size of the pizza, the crust type, etc., may represent the parameters.

A set of parameters required to fulfill the tasks associated with each of the intents may be identified (element 1310) based on additional input from the application designer or developer in the depicted embodiment. In some embodiments, two categories of parameters may be identified—required parameters, for which values have to be obtained in order to fulfill a given intent, and optional parameters, for which values are not essential but may be used if provided by the end user. Intent parameters may also be referred to as "slots" in some embodiments.

In one embodiment, the service may determine, e.g., based on input received from the developer, various word strings to be used in a multi-step dialog for obtaining the intent parameter values (element 1313). No source code may be required from the application developer or designer in at least some embodiments, either for specifying the dialog flow, the algorithms or techniques to be used to capture and interpret speech or text signals from end users, the intents, intent parameters and the like. Instead, for example, graphical interface elements may be used to provide names of various entities and example word strings. In one embodiment, the NLU model(s) of the service may use the provided information to generate portions of the code (e.g., governing the back-and-forth flow of interactions with end users) of the dialog-driven application (element 1316).

An executable representation of the dialog-driven application, which comprises references to lexicons comprising the word strings to be used for the multi-step dialog, as well as invocation code for programs/functions to be used to fulfill the intents after the necessary parameter values are obtained, may be generated and stored (element 1319) in one embodiment. In some embodiments, natural language models may optionally be used to enhance/expand the lexicons prior to initial deployment or execution of the program (element 1322). For example, word strings learned from analyzing lexicons used for similar applications or analyzing other corpora may be added to the baseline word strings.

In one embodiment, a set of execution platforms may be identified for the dialog-driven application, and the application may be deployed at the execution platforms and made accessible to end users (element 1325). The original or baseline lexicons generated for the multi-step dialogs may be further enhanced over time, e.g., using log records of end user interactions for further training of NLU models designed to identify new word strings that may be appropriate for the interactions.

Figure 14:
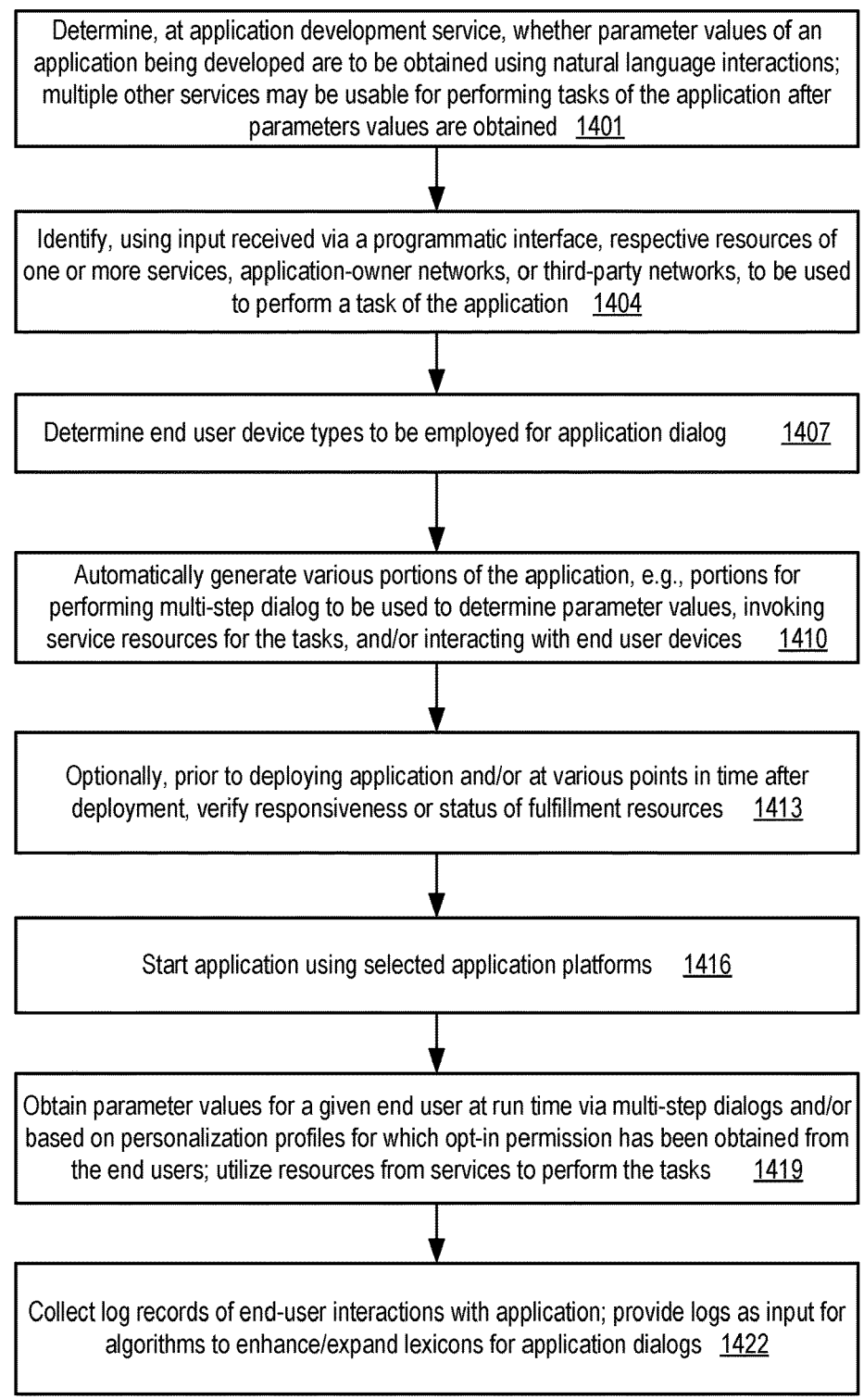
FIG. 14 is a flow diagram illustrating aspects of operations which may be performed to fulfill customer-requested tasks corresponding to intents of a dialog-driven application, according to at least some embodiments.

FIG. 14 is a flow diagram illustrating aspects of operations which may be performed to fulfill customer-requested tasks corresponding to intents of a dialog-driven application, according to at least some embodiments. As shown in element 1401, in one embodiment a determination may be made at an application development service of a provider network as to whether values of one or more parameters of an application (e.g., parameters associated with one or more intents of the application) are to be obtained using natural language interactions. The application development service may allow various other services and/or resources outside the provider network to be used to perform application tasks after the corresponding parameter values have been obtained at run time in the depicted embodiment.

Using input obtained via a programmatic interface, one or more resources to be used for the dialog-driven application under development may be identified (element 1404) in the depicted embodiment. The resources may be associated with various network-accessible services of a provider network (such as a dynamic provisioning compute service, in which execution platforms are selected for registered programs at run time, or a virtual computing service in which guest virtual machines are pre-allocated to clients), or may be part of external networks such as customer-owned networks or third-party networks in various embodiments. A given intent of a given application may utilize resources from several different services in some embodiments. The input received via the programmatic interface may indicate, in one embodiment, the particular service being used, a resource identifier (such as a URI), parameters that are to be transmitted to the resource to perform the task, and/or an indication of the invocation mechanism (such as the signature of an API call to be issued). In one embodiment, fulfilling a task of a single intent may involve the use of multiple programs or APIs—e.g., a result may have to be obtained from a first program via a first API, and depending on the value of the result, a second program may be invoked using a second API. In one embodiment, the application developer or designer may not have to provide source code to indicate the services, resources or invocation mechanisms to be used to fulfill the tasks. Instead, the identifiers of the services and resources may be provided by the application developer to the application management service, e.g., using a graphical user interface, a command line tool, or the like in such an embodiment. In embodiments in which multiple program or function invocations are to be used for a single intent, the sequential or logical relationships between the invoked programs may be indicated without providing source code. In at least some embodiments, an application developer may register programs, functions or resources with the application management service in advance of developing any given dialog-driven application, and may utilize the programs, functions or resources from multiple dialog-driven applications if desired.

An indication of the end user device types expected to be utilized for the interactions with the dialog-driven application may also be provided to the application management service (element 1407) in the depicted embodiment. Any combination of a wide variety of device types may be specified in one embodiment, such as various types of smart phones and associated phone operating systems, tablet or handheld devices, laptops or desktops, wearable devices such as smart watches or glasses, virtual reality interface devices, augmented reality interface devices and the like. Such device type information may be used, in one embodiment, by the application management service to identify the appropriate communication modules to be included in the executable representation of the application. In some embodiments, a default set of end user device types may be used, or the end user device types may be inferred from the application domain or application name; as such, in at least some embodiments an explicit indication of end user device types may not have to be provided. In one embodiment, a binding between devices types and the application may not be implemented until run time—that is, the program may be designed, built and/or tested independently of the end user devices to be used at run time.

Various portions of the application may be generated automatically and stored in one embodiment (element 1410). The portions may include code for dialogs to be used to determine intent parameter values, invocation information for the different resources/services to be used for performing or fulfilling the tasks once the parameter values have been determined, as well as modules for interacting with the end-user devices expected to be used in some embodiments.

In some embodiments, the application management service may check the availability and/or status of the fulfillment resources to be used for the intent tasks (element 1413). For example, prior to deploying a given dialog-driven application and making it available for end users, in one embodiment the service may utilize the resource invocation information provided by the application developer to ensure that when the resources are invoked on behalf of end users, meaningful results are returned. Such status checks may also be performed at various points in time (e.g., at scheduled time intervals) after deployment in some embodiments.

The dialog-driven application may be started up at selected execution platforms (element 1416) in the depicted embodiment. The particular application platforms used may be selected by the service in one embodiment, based on various factors such as the availability of resources, application owner preferences, and the like. In some embodiments, a virtual computing service and/or other computing services of a provider network may be used for running the dialog portions of the programs. In various embodiments, a front-end dialog initiation component of the program (e.g., a program that detects a wake word or a signal to start the application dialogs) may be deployed to end user devices indicated by the application developer/designer. Such front-end components may be transmitted to the devices via, for example, automated or end-user-scheduled application updates in some embodiments.

Values of the parameters for intents or tasks of the application may be obtained using the multi-step dialogs and/or based on stored profile information of the end user (element 1419) in one embodiment. In one embodiment, before profile information can be used for a given end user, the end user may have to grant permission storing profile information at the application management service is acceptable. The appropriate resources may be utilized from various services and/or external networks to fulfill the intents after the parameter values are determined in the depicted embodiment.

Log records of end-user interactions with the application may be collected (element 1422) in the depicted embodiment. Such log records may be provided as input to NLU or other machine learning algorithms to enhance or expand the lexicons associated with the applications in one embodiment, e.g., by introducing learned word strings into the lexicons. In at least some embodiments, learned word strings may be identified prior to the deployment of the application, e.g., based on analyzing lexicons of related applications of the same problem domain, or based on analyzing various corpora of language usage.

It is noted that in various embodiments, some of the operations shown in FIG. 13 or FIG. 14 may be implemented in a different order than that shown in the figure, or may be performed in parallel rather than sequentially. Additionally, some of the operations shown in FIG. 13 and/or FIG. 14 may not be required in one or more implementations.

Illustrative Computer System

Figure 15:
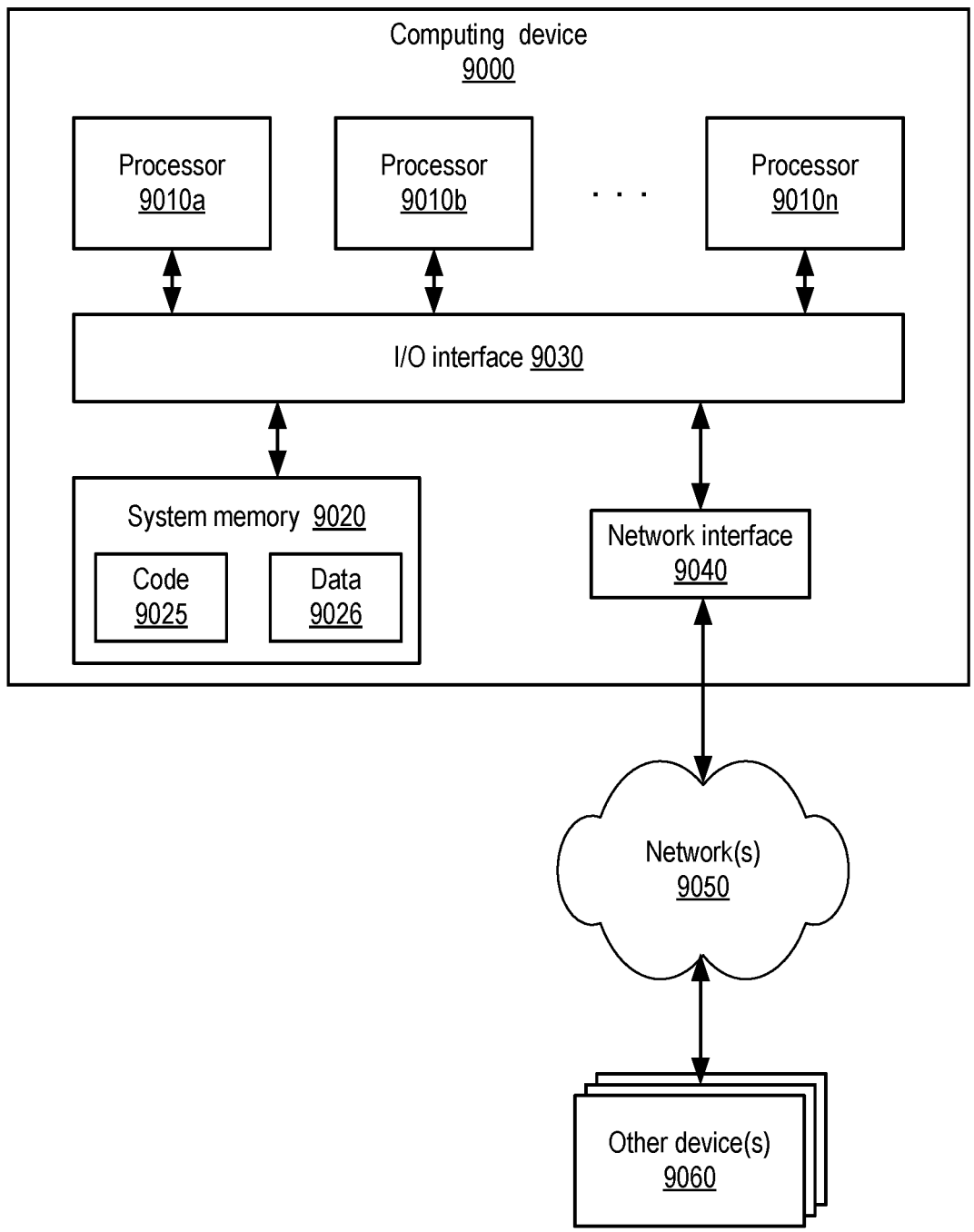
FIG. 15 is a block diagram illustrating an example computing device that may be used in at least some embodiments.

In at least some embodiments, a server that implements one or more of the techniques described above for developing and deploying dialog-driven applications, including generating code for the multi-step dialogs as well as fulfillment of intent tasks, may include a general-purpose computer system that includes or is configured to access one or more computer-accessible media. FIG. 15 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a Low Pin Count (LPC) bus, a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 14, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 14 for implementing embodiments of the corresponding methods and apparatus. However, in other embodiments, program instructions and/or data may be received, sent or stored upon different types of computer-accessible media. In one embodiment, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. In some embodiments, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:
   prior to depolying an application to make it available for a user:
      obtaining, via one or more programmatic interfaces of a dialog-driven-application management service of a cloud computing environment, a request to define a first intent of the application, wherein the first intent corresponds to a first task to be initiated on behalf of the user in response to one or more dialog inputs obtained from the user via on or more end user-related programmatic interfaces;
      storing an indication of one or more parameters of the first intent; wherein the first task is to be performed based on the one or more parameters of the first internet;
      provisioning, in the cloud computing environment, one or more computer resources to perform a least a first portion of the first task wherein the one or more compute resources includes one or more virtual machines allocated for the application, and
      generating integration code to integrate the application with a fulfillment resource external to the cloud computing environment, wherein the fulfillment resource is configured to perform a least a second portion of the first task; and
   after the application is deployed:
      receiving, from the application, one or more respective values of the one or more parameters of the first intent determined based at least in part on processing of a dialog input from the user using one or more machine learning models, wherein the one or more machine learning models generates a match score of the dialog input with respect to the first intent and the match score exceeds a match threshold,
      causing the one or more compute resources of the cloud computing environment to perform the first portion of the first task based on the respective values of the one or more parameters; and
      causing the second portion of the first task to be performed at by the fulfillment resource external to the cloud computing environment.

2. The computer-implemented method as recited in claim 1, further comprising:
   obtaining, via the one or more programmatic interfaces, an indication of another service of the cloud computing environment which is to be used to perform the first portion of the first task, and
   causing, during the execution of the application, the first portion of the first task to be performed at the other service.

3. The computer-implemented method as recited in claim 1, further comprising:
   obtaining, via the one or more programmatic interfaces, an indication of a sequence in which a plurality of resources are to be employed to perform one or more tasks of the application; and
   causing, during the execution of the application, the one or more tasks to be performed at the plurality of resources in the indicated sequence.

4. The computer-implemented method as recited in claim 1, further comprising:
   obtaining, via the one or more programmatic interfaces, an indication of one or more initiation words for a dialog of the application, and
   initiating execution of the application based at least in part on a detection, within input provided by the user, of an initiation word of the one or more initiation words.

5. The computer-implemented method as recited in claim 1, wherein the integration code transmits one or more commands to a web service interface.

6. The computer-implemented method as recited in claim 1, further comprising:
   obtaining, via the one or more programmatic interfaces, an indication of a number of attempts to be made to determine a value of a first parameter of the one or more parameters before abandoning a dialog interaction of the application.

7. The computer-implemented method as recited in claim 1, further comprising:
   inserting, into a lexicon associated with the application, one or more words learned by a natural language understanding model from log records of user interactions with the application, and
   utilizing the one or more learned words in one or more other user interactions.

8. A system, comprising:
one or more computing devices,
wherein the one or more computing devices include instructions that upon execution on or across the one or more computing devices cause the one or more computing devices to:
prior to deployment of an application to make it available for a user:
obtain, via one or more development-related programmatic interfaces of a dialog-driven application management service of a cloud computing environment, a request to define a first intent of the application, wherein the first intent corresponds to a first task to be initiated on behalf of the user in response to one or more dialog inputs obtained from the user via one or more end user-related programmatic interfaces,
store an indication of one or more parameters of the first intent, wherein the first task is to be performed based on the one or more parameters of the first intent;
provision, in the cloud computing environment, one or more compute resources to perform a least a first portion of the first task, wherein the one or more compute resources includes one or more virtual machines allocated for the application, and
generating integration code to integrate the application with a fulfillment resource external to the cloud computing environment, wherein the fulfillment resource is configured to perform a least a second portion of the first task; and
after the deployment of the application:
receive, from the application, one or more respective values of the one or more parameters of the first intent determined based at least in part on processing of a dialog input from the user using one or more machine learning model, wherein the one or more machine learning models generates a match score of the dialog input with respect to the first intent and the match score exceeds a match threshold,
cause the one or more compute resources of the cloud computing environment to perform the first portion of the first task based on the respective values of the one or more parameters; and
cause the second portion of the first task to be performed at by the fulfillment resource external to the cloud computing environment.

9. The system as recited in claim 8, wherein the one or more computing devices include further instructions that upon execution on or across the one or more computing devices further cause the one or more computing devices to:
obtain, via the one or more programmatic interfaces, an indication of another service of the cloud computing environment which is to be used to perform the first portion of the first task, and
initiate, during the execution of the application, the first portion of the first task at the other service.

10. The system as recited in claim 8, wherein the one or more computing devices include further instructions that upon execution on or across the one or more computing devices further cause the one or more computing devices to:
obtain, via the one or more programmatic interfaces, an indication of a sequence in which a plurality of resources are to be employed to perform one or more tasks of the application, and
initiate, during the execution of the application, the one or more tasks at the plurality of resources in the indicated sequence.

11. The system as recited in claim 8, wherein the one or more computing devices include further instructions that upon execution on or across the one or more computing devices further cause the one or more computing devices to:
obtain, via the one or more programmatic interfaces, an indication of one or more initiation words for a dialog of the application; and
initiate execution of the application based at least in part on a detection, within input provided by the user, of an initiation word of the one or more initiation words.

12. The system as recited in claim 8, wherein the integration code transmits one or more commands to a web service interface.

13. The system as recited in claim 8, wherein the one or more computing devices include further instructions that upon execution on or across the one or more computing devices further cause the one or more computing devices to:
obtain, via the one or more programmatic interfaces, an indication of a number of attempts to be made to determine a value of a first parameter of the one or more parameters before abandoning a dialog interaction of the application.

14. The system as recited in claim 8, wherein the one or more computing devices include further instructions that upon execution on or across the one or more computing devices further cause the one or more computing devices to:
inserting, into a lexicon associated with the application, one or more words learned by a natural language understanding model from log records of user interactions with the application, and utilizing the one or more learned words in one or more other user interactions.

15. One or more non-transitory computer-accessible storage media storing program instructions that when executed on or across one or more processors cause the one or more processors to:
prior to deployment of an application to make it available for a user:
obtain, via one or more development-related programmatic interfaces of a dialog-driven application management service of a cloud computing environment, a request to define a firstintent of the application, wherein the firstintent corresponds to a firsttask to be initiated on behalf of the user in response to one or more dialog inputs obtained from the user via one or more end user-related programmatic interfaces;
store an indication of one or more parameters of the firstintent, wherein the first task is to be performed based on the one or more parameters of the first intent,
provision, in the cloud computing environment, one or more compute resources to perform a least a first portion of the first task, wherein the one or more compute resources includes one or more virtual machines allocated for the application, and
generate integration code to integrate the application with a fulfillment resource external to the cloud computing environment, wherein the fulfillment resource is configured to perform a least a second portion of the first task; and
after the deployment of the application:
receive, from the application, one or more respective values of the one or more parameters of the firstintent determined based at least in part on processing of a dialog input from the user using one or more machine learning models, wherein the one or more machine learning models generates a match score of the dialog input with respect to the firstintent and the match score exceeds a match threshold;

cause the one or more compute resources of the cloud computing environment to perform the first portion of the first task based on the respective values of the one or more parameters; and cause the second portion of the firsttask to be performed at by the fulfillment resource external to the cloud computing environment.

16. The one or more non-transitory computer-accessible storage media as recited in claim 15, storing further program instructions that when executed on or across one or more processors further cause the one or more processors to:

obtain, via the one or more programmatic interfaces, an indication of another service of the cloud computing environment which is to be used to perform the first portion of the first task, and initiate, during the execution of the application, the first portion of the first task at the other service.

17. The one or more non-transitory computer-accessible storage media as recited in claim 15, storing further program instructions that when executed on or across one or more processors further cause the one or more processors to:

obtain, via the one or more programmatic interfaces, an indication of a sequence in which a plurality of resources are to be employed to perform one or more tasks of the application; and initiate, during the execution of the application, the one or more tasks at the plurality of resources in the indicated sequence.

18. The one or more non-transitory computer-accessible storage media as recited in claim 15, storing further program instructions that when executed on or across one or more processors further cause the one or more processors to:

obtain, via the one or more programmatic interfaces, an indication of one or more initiation words for a dialog of the application, and initiate execution of the application based at least in part on a detection, within input provided by the user, of an initiation word of the one or more initiation words.

19. The one or more non-transitory computer-accessible storage media as recited in claim 15, wherein the integration code transmits one or more commands to a web service interface.

20. The one or more non-transitory computer-accessible storage media as recited in claim 15, storing further program instructions that when executed on or across one or more processors further cause the one or more processors to:

obtain, via the one or more programmatic interfaces, an indication of a number of attempts to be made to determine a value of a firstparameter of the one or more parameters before abandoning a dialog interaction of the application.

* * * * *